(12) United States Patent
Rodriguez et al.

(10) Patent No.: US 9,042,702 B2
(45) Date of Patent: May 26, 2015

(54) PLATFORMS AND SYSTEMS FOR FIBER OPTIC CABLE ATTACHMENT

(71) Applicants: Diana Rodriguez, Fort Worth, TX (US); William Julius McPhil Giraud, Azle, TX (US)

(72) Inventors: Diana Rodriguez, Fort Worth, TX (US); William Julius McPhil Giraud, Azle, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/621,958

(22) Filed: Sep. 18, 2012

(65) Prior Publication Data

US 2014/0079366 A1 Mar. 20, 2014

(51) Int. Cl.
*G02B 6/00* (2006.01)
*G02B 6/36* (2006.01)
*G02B 6/38* (2006.01)

(52) U.S. Cl.
CPC ............... *G02B 6/36* (2013.01); *G02B 6/3878* (2013.01); *G02B 6/3897* (2013.01)

(58) Field of Classification Search
CPC .. G02B 6/4452; G02B 6/4463; G02B 6/4455; G02B 6/4471; G02B 6/3807
USPC .................................................. 385/134–137
See application file for complete search history.

(56) References Cited

U.S. PATENT DOCUMENTS

| | | |
|---|---|---|
| 620,013 A | 2/1899 | Barnes |
| 2,528,910 A | 11/1950 | Poe |
| 2,614,685 A | 10/1952 | Miller |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,646,244 A | 2/1972 | Cole |
| 3,664,514 A | 5/1972 | Drake |
| 3,683,238 A | 8/1972 | Olds et al. |
| 3,701,835 A | 10/1972 | Eisele et al. |

(Continued)

FOREIGN PATENT DOCUMENTS

| | | |
|---|---|---|
| AU | 2010270959 A1 | 2/2012 |
| CA | 2029592 A1 | 5/1992 |

(Continued)

OTHER PUBLICATIONS

International Search Report for PCT/US2010/023901 mailed Jun. 11, 2010, 3 pages.

(Continued)

*Primary Examiner* — Ellen Kim

(57) ABSTRACT

Platforms for connecting fiber optic cable assemblies to fiber optic equipment using a universal footprint are disclosed. In one embodiment, a platform for connecting at least one fiber optic cable assembly to fiber optic equipment includes a coupling surface having at least one cable engagement feature, wherein the at least one cable engagement feature is configured to couple the at least one fiber optic cable assembly to the coupling surface, and a plurality of plate engagement features configured to be removably coupled to a plurality of equipment engagement features positioned on the fiber optic equipment. Fiber optic cable assembly coupling systems for coupling fiber optic cable assemblies to fiber optic equipment are also disclosed.

26 Claims, 11 Drawing Sheets

(56) References Cited

U.S. PATENT DOCUMENTS

| | | | |
|---|---|---|---|
| 3,880,396 | A | 4/1975 | Freiberger et al. |
| 3,906,592 | A | 9/1975 | Sakasegawa et al. |
| 3,991,960 | A | 11/1976 | Tanaka |
| 4,047,797 | A | 9/1977 | Arnold et al. |
| 4,059,872 | A | 11/1977 | Delesandri |
| 4,119,285 | A | 10/1978 | Bisping et al. |
| 4,148,454 | A | 4/1979 | Carlson et al. |
| 4,239,316 | A | 12/1980 | Spaulding |
| 4,244,638 | A | 1/1981 | Little et al. |
| 4,285,486 | A | 8/1981 | Von Osten et al. |
| 4,303,296 | A | 12/1981 | Spaulding |
| 4,354,731 | A | 10/1982 | Mouissie |
| 4,457,482 | A | 7/1984 | Kitagawa |
| 4,525,012 | A | 6/1985 | Dunner |
| 4,540,222 | A | 9/1985 | Burrell |
| 4,561,615 | A | 12/1985 | Medlin, Jr. |
| 4,564,163 | A | 1/1986 | Barnett |
| 4,597,173 | A | 7/1986 | Chino et al. |
| 4,611,875 | A | 9/1986 | Clarke et al. |
| 4,635,886 | A | 1/1987 | Santucci et al. |
| 4,645,292 | A | 2/1987 | Sammueller |
| 4,657,340 | A | 4/1987 | Tanaka et al. |
| 4,681,288 | A | 7/1987 | Nakamura |
| 4,711,518 | A | 12/1987 | Shank et al. |
| 4,736,100 | A | 4/1988 | Vastagh |
| 4,744,629 | A | 5/1988 | Bertoglio et al. |
| 4,747,020 | A | 5/1988 | Brickley et al. |
| 4,752,110 | A | 6/1988 | Blanchet et al. |
| 4,753,510 | A | 6/1988 | Sezerman |
| 4,787,706 | A | 11/1988 | Cannon, Jr. et al. |
| 4,792,203 | A | 12/1988 | Nelson et al. |
| 4,798,432 | A | 1/1989 | Becker et al. |
| 4,805,979 | A * | 2/1989 | Bossard et al. ............... 385/135 |
| 4,808,774 | A | 2/1989 | Crane |
| 4,824,193 | A | 4/1989 | Maeda et al. |
| 4,824,196 | A | 4/1989 | Bylander |
| 4,826,277 | A | 5/1989 | Weber et al. |
| 4,838,643 | A | 6/1989 | Hodges et al. |
| 4,840,449 | A | 6/1989 | Ghandeharizadeh |
| 4,865,280 | A | 9/1989 | Wollar |
| 4,898,448 | A | 2/1990 | Cooper |
| 4,900,123 | A | 2/1990 | Barlow |
| 4,911,662 | A | 3/1990 | Debortoli et al. |
| 4,948,220 | A | 8/1990 | Violo et al. |
| 4,949,376 | A | 8/1990 | Nieves et al. |
| 4,971,421 | A | 11/1990 | Ori |
| 4,986,625 | A * | 1/1991 | Yamada et al. ................. 385/55 |
| 4,988,831 | A | 1/1991 | Wilson et al. |
| 4,991,928 | A | 2/1991 | Zimmer |
| 4,995,688 | A | 2/1991 | Anton et al. |
| 5,001,602 | A | 3/1991 | Suffi et al. |
| 5,005,941 | A | 4/1991 | Barlow et al. |
| 5,017,211 | A | 5/1991 | Wenger et al. |
| 5,023,646 | A | 6/1991 | Ishida et al. |
| 5,024,498 | A | 6/1991 | Becker et al. |
| 5,028,114 | A | 7/1991 | Krausse et al. |
| 5,037,175 | A | 8/1991 | Weber |
| 5,048,918 | A | 9/1991 | Daems et al. |
| 5,060,897 | A | 10/1991 | Thalenfeld |
| 5,066,149 | A | 11/1991 | Wheeler et al. |
| 5,067,784 | A | 11/1991 | Debortoli et al. |
| 5,071,211 | A | 12/1991 | Debortoli et al. |
| 5,071,220 | A | 12/1991 | Ruello et al. |
| 5,073,042 | A | 12/1991 | Mulholland et al. |
| 5,074,635 | A | 12/1991 | Justice et al. |
| 5,076,688 | A | 12/1991 | Bowen et al. |
| 5,080,459 | A | 1/1992 | Wettengel et al. |
| 5,100,221 | A | 3/1992 | Carney et al. |
| 5,104,336 | A | 4/1992 | Hatanaka et al. |
| 5,125,060 | A | 6/1992 | Edmundson |
| 5,127,082 | A | 6/1992 | Below et al. |
| 5,127,851 | A | 7/1992 | Hilbert et al. |
| 5,129,607 | A | 7/1992 | Satoh |
| 5,138,678 | A | 8/1992 | Briggs et al. |
| D330,368 | S | 10/1992 | Bourgeois et al. |
| 5,170,452 | A | 12/1992 | Ott |
| 5,189,723 | A | 2/1993 | Johnson et al. |
| 5,199,099 | A | 3/1993 | Dalgoutte |
| 5,230,492 | A | 7/1993 | Zwart et al. |
| 5,274,729 | A | 12/1993 | King et al. |
| 5,278,933 | A | 1/1994 | Hunsinger et al. |
| 5,291,570 | A | 3/1994 | Filgas et al. |
| 5,315,679 | A | 5/1994 | Baldwin et al. |
| 5,329,520 | A | 7/1994 | Richardson |
| 5,363,467 | A | 11/1994 | Keith |
| 5,366,388 | A | 11/1994 | Freeman et al. |
| 5,390,272 | A | 2/1995 | Repta et al. |
| 5,398,820 | A | 3/1995 | Kiss |
| RE34,955 | E | 5/1995 | Anton et al. |
| 5,418,874 | A | 5/1995 | Carlisle et al. |
| 5,420,956 | A | 5/1995 | Grugel et al. |
| 5,420,958 | A | 5/1995 | Henson et al. |
| 5,421,532 | A | 6/1995 | Richter |
| 5,438,641 | A | 8/1995 | Malacarne |
| 5,442,725 | A | 8/1995 | Peng |
| 5,442,726 | A | 8/1995 | Howard et al. |
| 5,443,232 | A | 8/1995 | Kesinger et al. |
| 5,444,804 | A | 8/1995 | Yui et al. |
| 5,448,015 | A | 9/1995 | Jamet et al. |
| 5,450,518 | A | 9/1995 | Burek et al. |
| 5,458,019 | A | 10/1995 | Trevino |
| 5,471,555 | A | 11/1995 | Braga et al. |
| 5,479,505 | A | 12/1995 | Butler et al. |
| 5,481,634 | A | 1/1996 | Anderson et al. |
| 5,481,939 | A | 1/1996 | Bernardini |
| 5,490,229 | A | 2/1996 | Ghandeharizadeh et al. |
| 5,495,549 | A | 2/1996 | Schneider et al. |
| 5,497,416 | A | 3/1996 | Butler, III et al. |
| 5,497,444 | A | 3/1996 | Wheeler |
| 5,511,144 | A | 4/1996 | Hawkins et al. |
| 5,511,798 | A | 4/1996 | Kawamoto et al. |
| 5,519,804 | A | 5/1996 | Burek et al. |
| 5,530,786 | A | 6/1996 | Radliff et al. |
| 5,535,970 | A | 7/1996 | Gobbi |
| 5,538,213 | A | 7/1996 | Brown |
| 5,542,015 | A | 7/1996 | Hultermans |
| 5,546,495 | A | 8/1996 | Bruckner et al. |
| 5,548,641 | A | 8/1996 | Butler et al. |
| 5,553,183 | A | 9/1996 | Bechamps |
| 5,553,186 | A | 9/1996 | Allen |
| 5,563,971 | A | 10/1996 | Abendschein |
| 5,572,617 | A | 11/1996 | Bernhardt et al. |
| 5,575,680 | A | 11/1996 | Suffi |
| 5,577,151 | A | 11/1996 | Hoffer |
| 5,590,234 | A | 12/1996 | Pulido |
| 5,595,507 | A | 1/1997 | Braun et al. |
| 5,596,670 | A | 1/1997 | Debortoli et al. |
| 5,600,020 | A | 2/1997 | Wehle et al. |
| 5,602,954 | A | 2/1997 | Nolf et al. |
| 5,608,606 | A | 3/1997 | Blaney |
| 5,613,030 | A | 3/1997 | Hoffer et al. |
| 5,617,501 | A | 4/1997 | Miller et al. |
| 5,638,474 | A | 6/1997 | Lampert et al. |
| 5,640,476 | A | 6/1997 | Womack et al. |
| 5,640,482 | A | 6/1997 | Barry et al. |
| 5,647,043 | A | 7/1997 | Anderson et al. |
| 5,647,045 | A | 7/1997 | Robinson et al. |
| 5,650,334 | A | 7/1997 | Zuk et al. |
| 5,668,910 | A | 9/1997 | Arnett |
| 5,668,911 | A | 9/1997 | Debortoli |
| 5,671,273 | A | 9/1997 | Lanquist |
| 5,689,605 | A | 11/1997 | Cobb et al. |
| 5,689,607 | A | 11/1997 | Vincent et al. |
| 5,692,079 | A | 11/1997 | Iso |
| 5,694,511 | A | 12/1997 | Pimpinella et al. |
| 5,701,380 | A | 12/1997 | Larson et al. |
| 5,704,573 | A | 1/1998 | de Beers et al. |
| 5,708,742 | A | 1/1998 | Beun et al. |
| 5,708,751 | A | 1/1998 | Mattei |
| 5,710,851 | A | 1/1998 | Walter et al. |
| 5,717,810 | A | 2/1998 | Wheeler |
| 5,734,776 | A | 3/1998 | Puetz |
| 5,740,300 | A | 4/1998 | Hodge |
| 5,742,982 | A | 4/1998 | Dodd et al. |

(56) References Cited

U.S. PATENT DOCUMENTS

| | | |
|---|---|---|
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,987,203 A | 11/1999 | Abel et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,049,963 A | 4/2000 | Boe |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,127,627 A | 10/2000 | Daoud |
| 6,130,983 A | 10/2000 | Cheng |
| 6,134,370 A | 10/2000 | Childers et al. |
| 6,141,222 A | 10/2000 | Toor et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,200,170 B1 | 3/2001 | Amberg et al. |
| 6,201,919 B1 | 3/2001 | Puetz et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,227,717 B1 | 5/2001 | Ott et al. |
| 6,229,948 B1 * | 5/2001 | Blee et al. ............... 385/134 |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 * | 6/2001 | Ichihara ............... 385/56 |
| 6,250,816 B1 | 6/2001 | Johnston et al. |
| 6,259,850 B1 | 7/2001 | Crosby, Jr. et al. |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | De Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,392,140 B1 | 5/2002 | Yee et al. |
| 6,397,166 B1 | 5/2002 | Leung et al. |
| 6,398,149 B1 | 6/2002 | Hines et al. |

(56) References Cited

U.S. PATENT DOCUMENTS

| | | | |
|---|---|---|---|
| 6,406,314 B1 | 6/2002 | Byrne |
| 6,410,850 B1 | 6/2002 | Abel et al. |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 * | 7/2003 | Fritz ........................ 385/135 |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 | 9/2003 | Mahony |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,728,462 B2 * | 4/2004 | Wu et al. ........................ 385/137 |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,792,191 B1 | 9/2004 | Clapp, Jr. et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |

(56) References Cited

U.S. PATENT DOCUMENTS

| | | |
|---|---|---|
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |

(56) References Cited

U.S. PATENT DOCUMENTS

| | | |
|---|---|---|
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,899,298 B2 * | 3/2011 | Cox et al. ................. 385/135 |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 * | 3/2012 | Kowalczyk et al. .......... 385/135 |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 * | 2/2013 | Wakileh et al. ............... 385/147 |
| 8,391,666 B2 | 3/2013 | Hetzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,824,850 B2 | 9/2014 | Garcia et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0037139 A1 | 3/2002 | Asao et al. |
| 2002/0131730 A1 | 9/2002 | Keeble et al. |
| 2002/0136519 A1 | 9/2002 | Tinucci et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0086675 A1 | 5/2003 | Wu et al. |
| 2003/0095753 A1 | 5/2003 | Wada et al. |
| 2003/0123834 A1 | 7/2003 | Burek et al. |
| 2003/0156552 A1 | 8/2003 | Banker et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0210882 A1 | 11/2003 | Barthel et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0120679 A1 | 6/2004 | Vincent et al. |
| 2004/0151465 A1 | 8/2004 | Krampotich et al. |
| 2004/0196841 A1 | 10/2004 | Tudor et al. |
| 2004/0208459 A1 | 10/2004 | Mizue et al. |
| 2004/0240827 A1 | 12/2004 | Daoud et al. |
| 2004/0240882 A1 | 12/2004 | Lipski et al. |
| 2005/0026497 A1 | 2/2005 | Holliday |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0178573 A1 | 8/2005 | James |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018622 A1 | 1/2006 | Caveney et al. |
| 2006/0034048 A1 * | 2/2006 | Xu ............................... 361/685 |
| 2006/0044774 A1 | 3/2006 | Vasavda et al. |
| 2006/0045458 A1 | 3/2006 | Sasaki et al. |
| 2006/0103270 A1 | 5/2006 | Bergesch et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0160377 A1 | 7/2006 | Huang |
| 2006/0165365 A1 | 7/2006 | Feustel et al. |
| 2006/0191700 A1 | 8/2006 | Herzog et al. |
| 2006/0204179 A1 | 9/2006 | Patel et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269205 A1 | 11/2006 | Zimmel |
| 2006/0269206 A1 | 11/2006 | Zimmel |
| 2006/0275008 A1 | 12/2006 | Xin |
| 2006/0285812 A1 | 12/2006 | Ferris et al. |
| 2007/0025070 A1 | 2/2007 | Jiang et al. |
| 2007/0033629 A1 | 2/2007 | McGranahan et al. |
| 2007/0047891 A1 | 3/2007 | Bayazit et al. |
| 2007/0058641 A1 | 3/2007 | Cicchetti et al. |
| 2007/0086723 A1 | 4/2007 | Sasaki et al. |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0221793 A1 | 9/2007 | Kusuda et al. |
| 2007/0237484 A1 * | 10/2007 | Reagan et al. ................. 385/134 |
| 2007/0257159 A1 | 11/2007 | Nelson et al. |

(56) References Cited

U.S. PATENT DOCUMENTS

| | | |
|---|---|---|
| 2007/0266192 A1 | 11/2007 | Campini et al. |
| 2007/0274718 A1 | 11/2007 | Bridges et al. |
| 2008/0031585 A1 | 2/2008 | Solheid et al. |
| 2008/0078899 A1 | 4/2008 | Chen et al. |
| 2008/0085094 A1 | 4/2008 | Krampotich |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0112681 A1 | 5/2008 | Battey et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0166131 A1 | 7/2008 | Hudgins et al. |
| 2008/0175541 A1 | 7/2008 | Lu et al. |
| 2008/0205823 A1 | 8/2008 | Luther et al. |
| 2008/0205843 A1 | 8/2008 | Castonguay et al. |
| 2008/0236858 A1 | 10/2008 | Quijano |
| 2008/0285934 A1 | 11/2008 | Standish et al. |
| 2008/0296060 A1 | 12/2008 | Hawley et al. |
| 2009/0016685 A1 | 1/2009 | Hudgins et al. |
| 2009/0038845 A1 | 2/2009 | Fransen et al. |
| 2009/0060440 A1 | 3/2009 | Wright et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0121092 A1 | 5/2009 | Keith |
| 2009/0136195 A1 | 5/2009 | Smrha et al. |
| 2009/0146342 A1 | 6/2009 | Haney et al. |
| 2009/0166404 A1 | 7/2009 | German et al. |
| 2009/0175588 A1 | 7/2009 | Brandt et al. |
| 2009/0184221 A1 | 7/2009 | Sculler |
| 2009/0194647 A1 | 8/2009 | Keith |
| 2009/0202214 A1 | 8/2009 | Holmberg et al. |
| 2009/0207577 A1 | 8/2009 | Fransen et al. |
| 2009/0208210 A1 | 8/2009 | Trojer et al. |
| 2009/0212679 A1 | 8/2009 | Frousiakis et al. |
| 2009/0220200 A1 | 9/2009 | Sheau Tung Wong et al. |
| 2009/0238531 A1 | 9/2009 | Holmberg et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269019 A1 | 10/2009 | Andrus et al. |
| 2009/0274432 A1 | 11/2009 | Iwaya |
| 2009/0290843 A1 | 11/2009 | Reagan et al. |
| 2009/0297111 A1 | 12/2009 | Reagan et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054683 A1 | 3/2010 | Cooke et al. |
| 2010/0054684 A1 | 3/2010 | Cooke et al. |
| 2010/0054686 A1 | 3/2010 | Cooke et al. |
| 2010/0054687 A1 | 3/2010 | Ye et al. |
| 2010/0080517 A1 | 4/2010 | Cline et al. |
| 2010/0086267 A1 | 4/2010 | Cooke et al. |
| 2010/0129035 A1 | 5/2010 | Teo |
| 2010/0142544 A1 | 6/2010 | Chapel et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0058786 A1 | 3/2011 | Zimmel |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0249950 A1* | 10/2011 | Chapa Ramirez et al. ... 385/135 |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0280535 A1 | 11/2011 | Womack |
| 2011/0280537 A1 | 11/2011 | Cowen et al. |
| 2012/0025683 A1 | 2/2012 | Mattlin et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0058616 A1* | 3/2013 | Cote et al. ............ 385/137 |
| 2013/0077927 A1 | 3/2013 | O'Connor |
| 2013/0214108 A1 | 8/2013 | Irudayaraj et al. |
| 2013/0243386 A1 | 9/2013 | Pimentel et al. |
| 2013/0266282 A1 | 10/2013 | Cote et al. |
| 2013/0308916 A1 | 11/2013 | Buff et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |

(56) References Cited

FOREIGN PATENT DOCUMENTS

| | | |
|---|---|---|
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| EP | 2060942 A2 | 5/2009 |
| EP | 2159613 A2 | 3/2010 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 8254620 A | 10/1996 |
| JP | 9258033 A | 10/1997 |
| JP | 9258055 A | 10/1997 |
| JP | 10227919 A | 8/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 2001133636 A | 5/2001 |
| JP | 2001154030 A | 6/2001 |
| JP | 2001159714 A | 6/2001 |
| JP | 2002022974 A | 1/2002 |
| JP | 2002077236 A | 3/2002 |
| JP | 2002116337 A | 4/2002 |
| JP | 2002169035 A | 6/2002 |
| JP | 2002305389 A | 10/2002 |
| JP | 3344701 B2 | 11/2002 |
| JP | 2003029054 A | 1/2003 |
| JP | 2003169026 A | 6/2003 |
| JP | 2003215353 A | 7/2003 |
| JP | 2003344701 A | 12/2003 |
| JP | 2004144808 A | 5/2004 |
| JP | 2004246147 A | 9/2004 |
| JP | 2005257937 A | 9/2005 |
| JP | 2006292924 A | 10/2006 |
| JP | 200747336 A | 2/2007 |
| JP | 2008271017 A | 11/2008 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A1 | 2/2003 |
| WO | 2004052066 A1 | 6/2004 |
| WO | 2005020400 A1 | 3/2005 |
| WO | 2006076062 A | 7/2006 |
| WO | 2006108024 A1 | 10/2006 |
| WO | 2007050515 A1 | 5/2007 |
| WO | 2007079074 A2 | 7/2007 |
| WO | 2007089682 A2 | 8/2007 |
| WO | 2007149215 A2 | 12/2007 |
| WO | 2008027201 A2 | 3/2008 |
| WO | 2008063054 A2 | 5/2008 |
| WO | 2008113054 A2 | 9/2008 |
| WO | 2008157248 A1 | 12/2008 |
| WO | 2009026688 A1 | 3/2009 |
| WO | 2009029485 A1 | 3/2009 |
| WO | 2009030360 A1 | 3/2009 |
| WO | 2009120280 A2 | 10/2009 |
| WO | 2010024847 A2 | 3/2010 |
| WO | 2010080745 A1 | 7/2010 |
| WO | 2011005461 A1 | 1/2011 |

OTHER PUBLICATIONS

Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-final Office Action for U.S. Appl. No. 13/688,675 mailed Jan. 31, 2014, 13 pages.
Non-final Office Action for U.S. Appl. No. 12/946,217 mailed Jul. 26, 2012, 25 pages.
Final Office Action for U.S. Appl. No. 12/946,217 mailed Mar. 18, 2013, 48 pages.
Non-final Office Action for U.S. Appl. No. 12/946,217 mailed Oct. 3, 2013, 47 pages.
Final Office Action for U.S. Appl. No. 12/946,217 mailed Apr. 25, 2014, 40 pages.
Non-final Office Action for U.S. Appl. No. 13/833,876 mailed Apr. 24, 2014, 7 pages.
Notice of Allowance for U.S. Appl. No. 12/953,536 mailed May 20, 2014, 9 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Final Office Action for U.S. Appl. No. 13/649,417 mailed Jun. 25, 2014, 9 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.
Non-final Office Action for U.S. Appl. No. 12/751,895 mailed May 20, 2014, 9 pages.
Notice of Allowance for U.S. Appl. No. 13/533,093 mailed Jul. 8, 2014, 9 pages.

(56) References Cited

OTHER PUBLICATIONS

Notice of Allowance for U.S. Appl. No. 13/597,549 mailed Jul. 8, 2014, 8 pages.
Notice of Allowance for U.S. Appl. No. 13/455,646 mailed Jun. 2, 2014, 9 pages.
Non-final Office Action for U.S. Appl. No. 12/819,065 mailed Jul. 18, 2014, 10 pages.
Final Office Action for U.S. Appl. No. 12/818,986 mailed Jul. 18, 2014, 27 pages.
Final Office Action for U.S. Appl. No. 13/081,856 mailed Jul. 2, 2014, 8 pages.
Notice of Allowance for U.S. Appl. No. 12/221,117 mailed Jul. 16, 2014, 7 pages.
Decision on Appeal for U.S. Appl. No. 12/221,117 mailed Jul. 1, 2014, 7 pages.
Author Unknown, "FiberManager Frame Cross-connect Configuration Fiber Tracing Option: Installation and Maintenance," Siecor Corporation, A0402884, Release 04.00, Jul. 1995, 80 pages.
Author Unknown, "FOS-FDF", Corning Cable Systems, SRP-003-305, Issue 4, Mar. 2001, 17 pages.
Author Unknown, "Optical Management Shelf (OMS)," Corning Cable Systems, Standard Recommended Procedure (SRP) 003-600, Issue 3, Apr. 2004, 9 pages.
Author Unknown, "Single Shelf HDF Installation," Standard Recommended Procedure (SRP) 003-377, Corning Cable Systems, Issue 5, Aug. 2001, pp. 1-12.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
SIECOR, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.

(56) References Cited

OTHER PUBLICATIONS

Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Non-final Office Action for U.S. Appl. No. 13/901,074 mailed Oct. 9, 2013, 6 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. ,12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
International Search Report for PCT/US2013/041268 mailed Aug. 20, 2013, 5 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.
Notice of Allowance and Applicant-Initiated Interview Summary for U.S. Appl. No. 12/771,473 mailed Feb. 27, 2014, 8 pages.
Non-final Office Action for U.S. Appl. No. 13/081,856 mailed Nov. 26, 2013, 11 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.
Final Office Action for U.S. Appl. No. 12/940,585 mailed Mar. 18, 2014, 15 pages.
Non-final Office Action for U.S. Appl. No. 12/953,101 mailed Apr. 3, 2014, 9 pages.
Advisory Action for U.S. Appl. No. 12/953,039 mailed Mar. 6, 2014, 3 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Notice of Allowance for U.S. Appl. No. 12/417,325 mailed Aug. 22, 2012, 7 pages.
International Search Report for PCT/US2012/023622 mailed Mar. 9, 2012, 4 pages.
International Search Report for PCT/US2012/023635 mailed Sep. 14, 2012, 3 pages.
International Search Report for PCT/US2012/023626 mailed May 22, 2012, 4 pages.
Notice of Allowance for U.S. Appl. No. 13/951,916 mailed Dec. 16, 2013, 12 pages.
International Preliminary Report on Patentability for PCT/US2012/052958 mailed Mar. 13, 2014, 14 pages.
Non-final Office Action for U.S. Appl. No. 12/947,883 mailed Sep. 6, 2013, 9 pages.
Final Office Action for U.S. Appl. No. 12/947,883 mailed Mar. 31, 2014, 13 pages.
International Search Report for PCT/US2011/030446 mailed Jul. 14, 2011, 2 pages.
International Search Report for PCT/US2011/030448 mailed Jul. 20, 2011, 2 pages.
International Search Report for PCT/US2011/030466 mailed Aug. 5, 2011, 2 pages.
International Search Report for PCT/US2012/052958 mailed Mar. 1, 2013, 7 pages.
International Search Report for PCT/US2013/041266 mailed Aug. 20, 2013, 4 pages.
Non-final Office Action for U.S. Appl. No. 13/621,958 mailed Feb. 13, 2014, 10 pages.
Non-final Office Action for U.S. Appl. No. 13/649,417 mailed Feb. 13, 2014, 10 pages.
Non-final Office Action for U.S. Appl. No. 13/663,949 mailed Feb. 3, 2014, 19 pages.
Non-final Office Action for U.S. Appl. No. 12/953,003 mailed Apr. 14, 2014, 13 pages.
Non-final Office Action for U.S. Appl. No. 12/953,039 mailed Apr. 15, 2014, 8 pages.
Final Office Action for U.S. Appl. No. 12/946,139 mailed Apr. 22, 2014, 18 pages.
Final Office Action for U.S. Appl. No. 13/597,549 mailed Apr. 24, 2014, 10 pages.
Final Office Action for U.S. Appl. No. 13/901,074 mailed May 9, 2014, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.

(56) References Cited

OTHER PUBLICATIONS

Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017/ mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
*Ex parte Quayle* Action for U.S. Appl. No. 12/953,164 mailed Aug. 16, 2013, 5 pages.
Non-final Office Action for U.S. Appl. No. 12/732,487 mailed Jul. 17, 2013, 22 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Final Office Action for U.S. Appl. No. 12/953,039 mailed Jul. 25, 2014, 10 pages.
Advisory Action for U.S. Appl. No. 12/953,039 mailed Oct. 3, 2014, 3 pages.
Notice of Allowance for U.S. Appl. No. 12/953,536 mailed Aug. 28, 2014, 9 pages.
Final Office Action for U.S. Appl. No. 13/901,074 mailed Sep. 5, 2014, 7 pages.
Final Office Action for U.S. Appl. No. 13/663,975 mailed Aug. 14, 2014, 42 pages.

(56) References Cited

OTHER PUBLICATIONS

Corrected Notice of Allowance for U.S. Appl. No. 13/533,093 mailed Sep. 2, 2014, 7 pages.
Notice of Allowance for U.S. Appl. No. 13/649,417 mailed Sep. 8, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 mailed Sep. 16, 2014, 4 pages.
Notice of Allowance for U.S. Appl. No. 13/455,646 mailed Sep. 26, 2014, 9 pages.
Non-Final Office Action for U.S. Appl. No. 13/663,949 mailed Sep. 25, 2014, 21 pages.
Non-Final Office Action for U.S. Appl. No. 13/688,675 mailed Sep. 30, 2014, 9 pages.
Notice of Allowance for U.S. Appl. No. 13/597,549 mailed Oct. 3, 2014, 8 pages.
Decision on Appeal for U.S. Appl. No. 11/320,062 mailed Aug. 14, 2014, 8 pages.
Final Office Action for U.S. Appl. No. 12/953,101 mailed Oct. 20, 2014, 14 pages.
Notice of Allowance for U.S. Appl. No. 13/533,093 mailed Oct. 17, 2014, 9 pages.
Notice of Allowance for U.S. Appl. No. 12/732,487 mailed Oct. 7, 2014, 8 pages.
Non-Final Office Action for U.S. Appl. No. 13/567,288 mailed Oct. 8, 2014, 7 pages.
Advisory Action for U.S. Appl. No. 12/818,986 mailed Oct. 15, 2014, 5 pages.
Examiner's Answer to the Appeal Brief for U.S. Appl. No. 12/953,134 mailed Aug. 1, 2014, 7 pages.
Non-final Office Action for U.S. Appl. No. 12/956,446 mailed Dec. 5, 2014, 12 pages.
Advisory Action for U.S. Appl. No. 13/663,975 mailed Dec. 24, 2014, 7 pages.
Final Office Action for U.S. Appl. No. 12/394,114 mailed Oct. 31, 2014, 10 pages.
Non-final Office Action for U.S. Appl. No. 12/940,699 mailed Oct. 28, 2014, 9 pages.
Non-final Office Action for U.S. Appl. No. 12/953,039 mailed Nov. 12, 2014, 8 pages.
Notice of Allowance for U.S. Appl. No. 12/952,960 mailed Nov. 10, 2014, 7 pages.
Notice of Allowance for U.S. Appl. No. 13/081,856 mailed Oct. 29, 2014, 10 pages.
Notice of Allowance for U.S. Appl. No. 13/833,876 mailed Nov. 7, 2014, 7 pages.
Advisory Action for U.S. Appl. No. 13/901,074 mailed Nov. 24, 2014, 3 pages.
Notice of Allowance for U.S. Appl. No. 12/751,895 mailed Nov. 19, 2014, 8 pages.
Advisory Action for U.S. Appl. No. 12/394,114 mailed Jan. 16, 2015, 3 pages.
Notice of Allowance and Examiner-Initiated Interview Summary for U.S. Appl. No. 12/947,883 mailed Jan. 13, 2015, 11 pages.
Non-final Office Action for U.S. Appl. No. 12/818,986 mailed Jan. 5, 2015, 21 pages.
Notice of Allowance for U.S. Appl. No. 13/649,417 mailed Jan. 8, 2015, 7 pages.
Non-final Office Action for U.S. Appl. No. 12/946,217 mailed Dec. 29, 2014, 50 pages.
Notice of Allowance and Examiner-Initiated Interview Summary for U.S. Appl. No. 12/940,585 mailed Feb. 27, 2015, 16 pages.
Notice of Allowance for U.S. Appl. No. 12/953,101 mailed Feb. 20, 2015, 9 pages.
Final Office Action for U.S. Appl. No. 12/953,003 mailed Feb. 12, 2015, 14 pages.
Final Office Action for U.S. Appl. No. 12/953,039 mailed Feb. 23, 2015, 9 pages.
Notice of Allowance for U.S. Appl. No. 13/688,675 mailed Jan. 26, 2015, 7 pages.
Final Office Action for U.S. Appl. No. 12/819,065 mailed Mar. 12, 2015, 13 pages.
Examiner's Answer to the Appeal Brief for U.S. Appl. No. 12/946,139 mailed Feb. 5, 2015, 12 pages.
Notice of Allowance for U.S. Appl. No. 12/707,889 mailed Feb. 17, 2015, 7 pages.
Non-final Office Action for U.S. Appl. No. 13/902,012 mailed Feb. 17, 2015, 9 pages.
Non-final Office Action for U.S. Appl. No. 13/081,856 mailed Feb. 9, 2015, 8 pages.

* cited by examiner

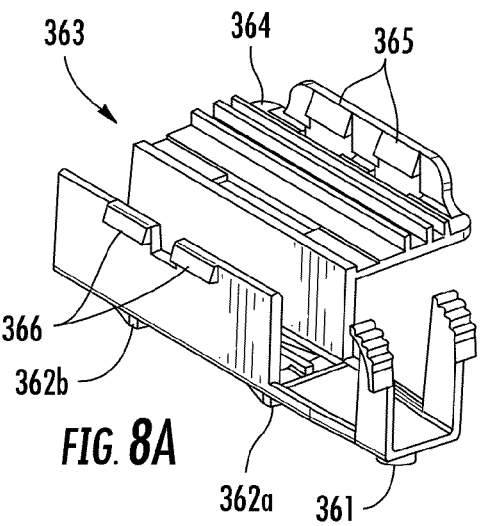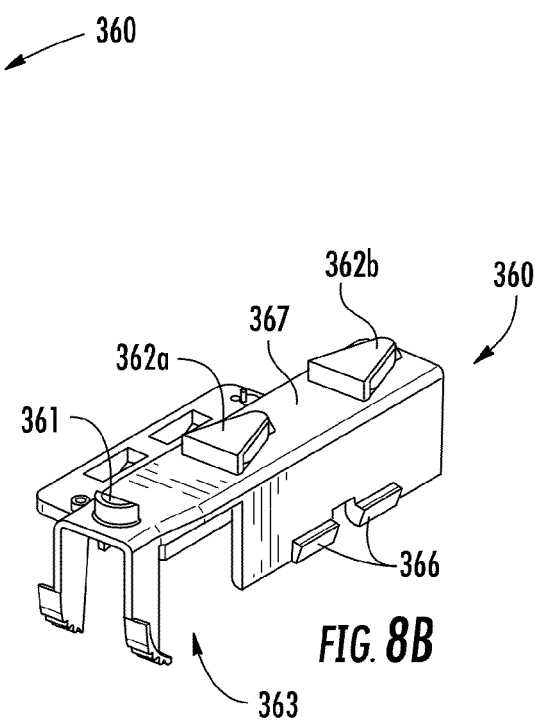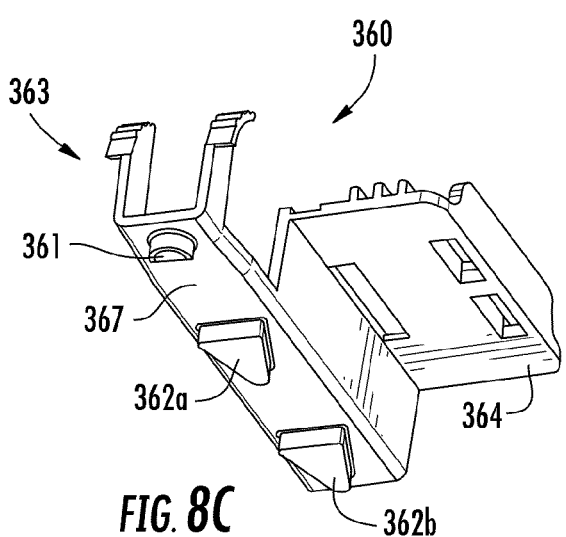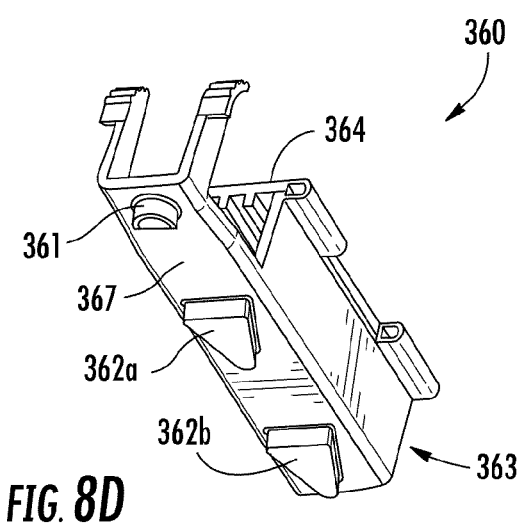

PLATFORMS AND SYSTEMS FOR FIBER OPTIC CABLE ATTACHMENT

BACKGROUND

1. Field

The present disclosure generally relates to fiber optic cable assemblies and, more particularly, to platforms for coupling fiber optic cable assemblies to fiber optic equipment using a universal footprint.

2. Technical Background

Fiber optic communication systems, such as fiber optic local area networks (LAN), for example, commonly include fiber optic equipment, such as racks, frames, sub-frames, or enclosures to provide for connection of a large number of connectorized optical fibers. For example, a fiber optic cable assembly may be configured as a trunk that includes a plurality of optical fibers within a jacket. The plurality of optical fibers within the trunk may then branch into a plurality of connectorized optical fibers (i.e., "legs") at a furcation location.

Typically, the fiber optic cable assembly is secured within the fiber optic equipment at the furcation location. For example, the furcation location may be secured to a surface within the fiber optic equipment by the use of tie-wraps, clips, or other features at the furcation location. However, presently there is a wide variety of fiber optic cable assemblies having a wide variety of furcation configurations. Therefore, the fiber optic equipment must have engagement features that match the particular type or types of fiber optic cable assemblies. For example, fiber optic equipment having engagement features to accept clips of a first configuration will not be able to secure fiber optic cable assemblies that use clips of a second configuration. Additionally, fiber optic equipment may have engagement features that only accept one type of fiber optic cable assembly. New or modified fiber optic equipment may need to be provided to accept different fiber optic cable assemblies, which may be costly.

SUMMARY

Embodiments described herein are directed to platforms that enable fiber optic equipment to have a universal footprint such that any type of fiber optic cable assembly may be secured to the fiber optic equipment. The interchangeable platforms allow coupling for a variety of cable applications. In this regard, in one embodiment, a platform for connecting at least one fiber optic cable assembly to fiber optic equipment includes a coupling surface having at least one cable engagement feature, wherein the at least one cable engagement feature is configured to couple the at least one fiber optic cable assembly to the coupling surface, and a plurality of plate engagement features configured to be removably coupled to a plurality of equipment engagement features positioned on the fiber optic equipment.

According to another embodiment, a fiber optic cable assembly coupling system includes at least one fiber optic cable assembly having an optical fiber cable, and a platform. The platform includes a coupling surface having at least one cable engagement feature, wherein the at least one cable engagement feature is configured to be coupled to the at least one fiber optic cable assembly, and a plurality of plate engagement features configured to be removably coupled to a plurality of equipment engagement features positioned on of the fiber optic equipment.

According to yet another embodiment, a platform for connecting one or more fiber optic cable assemblies to fiber optic equipment includes a coupling surface having at least one cable engagement feature, wherein the at least one cable engagement feature is configured to couple at least one fiber optic cable assembly to the coupling surface, a front wall extending from a front edge of the coupling surface, a first sidewall extending from a first edge of the coupling surface, a second sidewall extending from a second edge of the coupling surface, and a flange orthogonally extending from the front wall. The platform further includes a plurality of hook-shaped plate engagement features extending from a bottom edge of the first sidewall and the second sidewall. The plurality of hook-shaped plate engagement features is configured to be removably coupled to a plurality of engagement slots positioned on the fiber optic equipment. The platform further includes a spring-loaded pin disposed in the flange and operable to removably engage a retention opening on the fiber optic equipment.

According to yet another embodiment, a platform for connecting one or more fiber optic cable assemblies to fiber optic equipment includes a coupling surface having at least one cable engagement feature, wherein the at least one cable engagement feature is configured to couple at least one fiber optic cable assembly to the coupling surface, and a bottom surface that is opposite from the coupling surface. The platform further includes at least one plate engagement feature having a narrow region extending from the bottom surface, and a wide region extending from the narrow region, wherein the at least one plate engagement feature is operable to be inserted into a keyhole-shaped slot on the fiber optic equipment. The platform further includes a spring-loaded pin extending from the bottom surface, the spring-loaded pin operable to removably engage a retention opening on the fiber optic equipment.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8A depicts a top perspective view of another clip capable of being coupled to the platform depicted in FIG. 7 with a locking flap in an open position;

FIG. 8B depicts a bottom perspective view of the clip depicted in FIG. 8A with the locking flap in an open position;

FIG. 8C depicts a bottom perspective view of the clip depicted in FIG. 8A with the locking flap in an open position;

FIG. 8D depicts a bottom perspective view of the clip depicted in FIG. 8A with the locking flap in a closed position;

DETAILED DESCRIPTION

Generally, embodiments of the present disclosure are directed to components that enable fiber optic cable assemblies of various configurations to be secured within fiber optic equipment having a universal connection footprint. Fiber optic cable assemblies may be secured to fiber optic equipment, such as a rack, a frame, a sub-frame, and the like, to enable a fiber optic network, such as an optical local area network (LAN), for example. In some cases, the fiber optic cable assemblies are configured as trunks that split into a plurality of legs at a furcation. The legs may be configured as a plurality of optical cables and/or optical fibers. The furcation is secured to a surface of fiber optic equipment to provide optical fiber management, as well as optical fiber retention. The legs of the fiber optic cable assembly, which are typically connectorized, are then plugged into desired receptacles within the fiber optic equipment. In other cases, the optical cable assembly is configured as a single optical cable without a furcation. The embodiments described herein advantageously permit a universal footprint to which furcations of various styles (or other components of a fiber optic cable assembly, such as the connector and the fiber optic cable) may be connected despite physical differences.

More specifically, embodiments of the present disclosure include a platform having a coupling surface specific to one or more optical cable assembly configurations. The platform includes a plurality of plate engagement features that is configured to mate with the universal footprint provided within the fiber optic equipment. In this manner, the platform acts as an interface between the fiber optic equipment and the fiber optic cable assembly, thereby allowing any type of optical cable assembly to be mounted within the fiber optic equipment, regardless of the configuration.

Various embodiments are described in detail herein with specific reference to the appended figures.

Figure 1A:
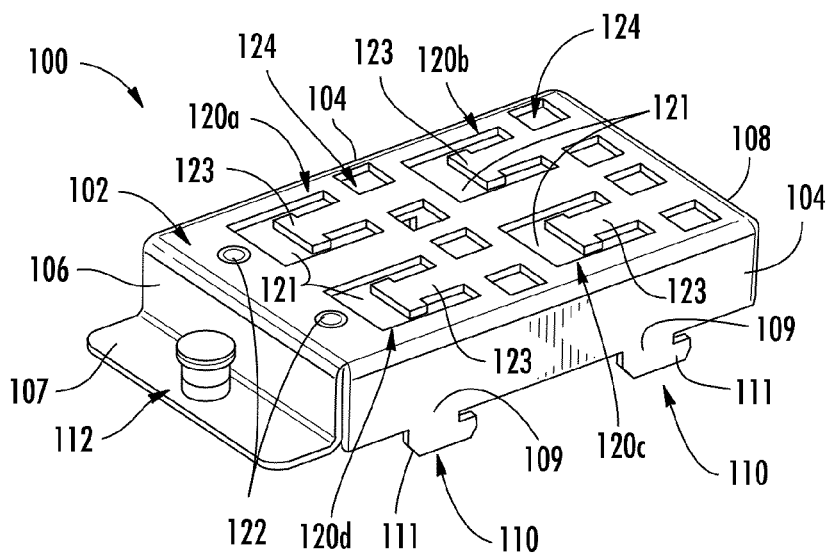
FIG. 1A depicts a top perspective view of a platform for connecting to fiber optic equipment, and configured to be coupled to a fiber optic cable assembly by a wrap.
Figure 1B:
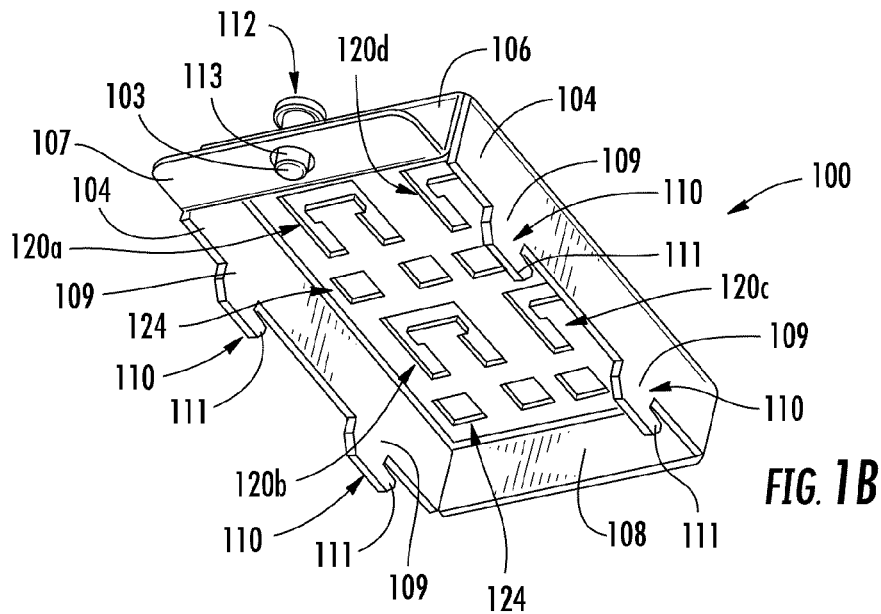
FIG. 1B depicts a bottom perspective view of the platform depicted in FIG. 1A.
Figure 2:
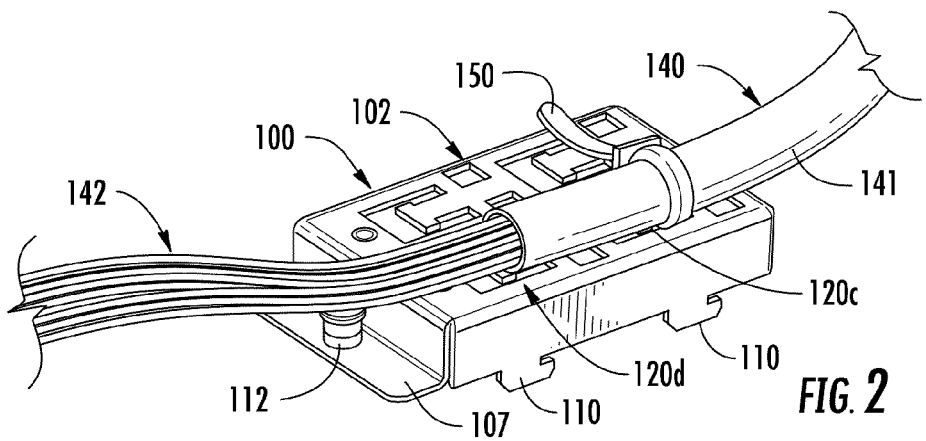
FIG. 2 depicts a top perspective view of a fiber optic cable assembly coupled to the platform depicted in FIG. 1A by a tie-wrap.
Figure 3A:
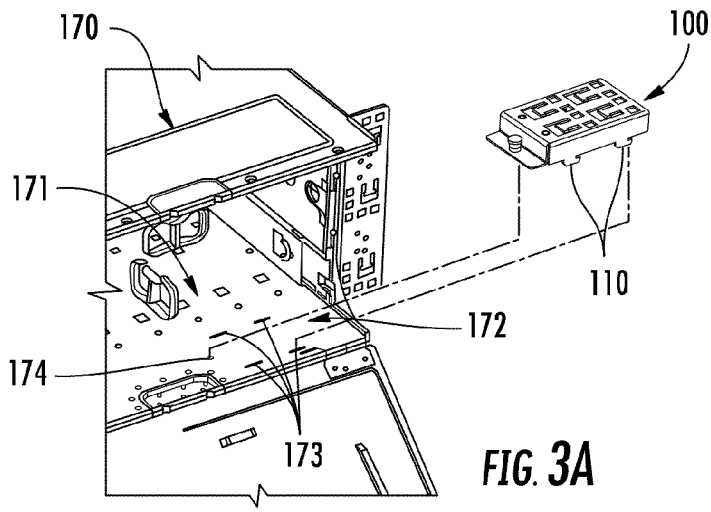
FIG. 3A depicts fiber optic equipment having a universal footprint.
Figure 3B:
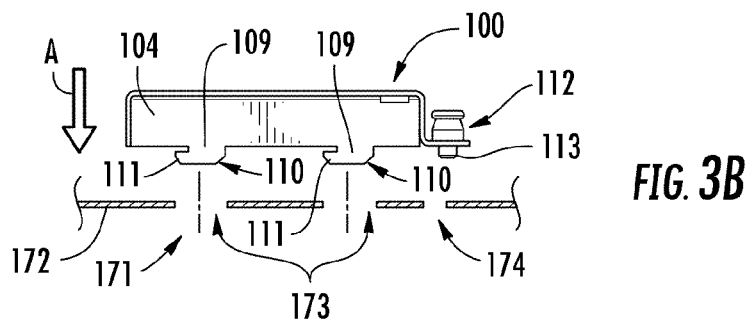
FIG. 3B depicts a partial cross-sectional view of the fiber optic equipment depicted in FIG. 3A and a platform in an uncoupled state.
Figure 3C:
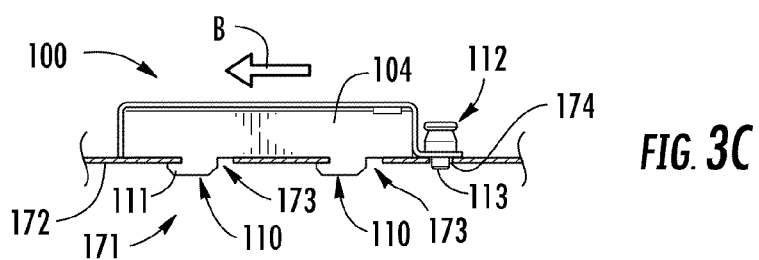
FIG. 3C depicts the partial cross-sectional view of the fiber optic equipment and the platform of FIG. 3B in a coupled state.

Referring initially to FIGS. 1A and 1B, one example of a platform 100 used as an interface between a surface plate 172 of fiber optic equipment 170 and one or more fiber optic cable assemblies 140 is illustrated. It is noted that FIG. 2 depicts a fiber optic cable assembly 140 coupled to the platform depicted in FIGS. 1A and 1B, and FIGS. 3A and 3B depict the same platform installed in fiber optic equipment 170. FIGS. 2, 3A, and 3B will be described in more detail below.

Referring specifically to FIGS. 1A and 1B, the exemplary platform 100 generally includes a coupling surface 102 to which one or more fiber optic cable assemblies may be coupled, either permanently or removably. The coupling surface 102 may be configured to accept only one style or configuration of fiber optic cable assembly (examples of which are described below), or more than one style or configuration. More specifically, the coupling surface 102 includes a plurality of cable engagement features that are designed according to the style or configuration of the desired fiber optic cable assembly. The coupling surface 102 may be configured to be coupled to a trunk of the fiber optic cable assembly, features that are present within a furcation of the fiber optic cable assembly, or features provided in a clip that is coupled to a furcation of the fiber optic cable assembly.

In the illustrated embodiment, the plurality of cable engagement features on the coupling surface 102 are designed to attach one or more fiber optic cable assemblies (e.g., fiber optic cable assembly 140 depicted in FIG. 2) by one or more wraps, such as tie-wrap or a Velcro wrap (see FIG. 2). More specifically, the plurality of cable engagement features of the exemplary embodiment are defined by first cable engagement features 120a-120d, second cable engagement features 122, and third cable engagement features 124. As shown in FIGS. 1A and 1B, the cable engagement features may be configured as openings within the coupling surface 102. It should be understood that embodiments are not limited to the configuration and placement of the engagement features depicted throughout the appended figures, as embodiments of the present disclosure may be utilized according to any known or yet-to-be-developed fiber optic cable assemblies and/or furcations.

The plurality of cable engagement features 120a-120d, 122, and 124 are designed as through-features through which one or more wraps may be disposed and wrapped around the fiber optic cable assembly 140. The first cable engagement features 120a-120d are configured as an opening 121 and a protrusion 123 around which a wrap 150 may be positioned. The protrusion 123, which in the illustrated embodiment has a narrow portion and a wide portion (i.e., generally "T" shaped), extends within the opening 121. Referring to FIG. 2, a fiber optic cable assembly 140 comprising a trunk 141 and a plurality of legs 142 at a furcation location with no dedicated furcation hardware is coupled to the platform 100 by a tie-wrap 150 that is wrapped around a portion of the trunk 141 and the protrusion of cable engagement feature 120c.

The second cable engagement features 122 are configured as through holes that may accept features of the fiber optic cable assembly, or a wrap as described above. Similarly, the third cable engagement features 124 are configured as square through-features into which features of a fiber optic cable assembly may be disposed, or into which one or more wraps 150 may be positioned to secure one or more fiber optic cable assemblies. As stated above, any number of cable engagement features may be provided at the coupling surface 102, as well as any configuration.

The platform 100 further comprises a plurality of plate engagement features 110 that are arranged and configured to mate to a universal footprint defined by equipment engagement features 173 on a surface plate 172 of the fiber optic equipment 170. It should be understood that embodiments are not limited to the particular plate engagement features 110 and equipment engagement features 173 depicted in FIGS. 1A, 1B, 2, 3A-3C, as other configurations are also possible. In the present exemplary embodiment, the platform 100 includes sidewalls 104 that extend from the coupling surface 102 such that the plate engagement features 110 are located at the bottom of the sidewalls 104. Two plate engagement features 110 are provide for each sidewall 104; however, more or fewer may be provided. Although the plate engagement features 110 are shown at the bottom of two sidewalls, the platform 100 may not include sidewalls such that the plate engagement features 110 extend directly from the coupling surface 102.

The plate engagement features 110 of the illustrated embodiment are generally hook-shaped, as they include a narrow perpendicular portion 109, and a wide horizontal portion 111 that is substantially orthogonal to the narrow perpendicular portion 109. As described in more detail below, the wide horizontal portion 111 fits into an engagement slot 173 on the surface plate 172, and the platform 100 is shifted such that a thickness of the surface plate 172 is positioned between the wide horizontal portion 111 and the sidewall 104, thereby preventing the platform 100 from being lifted off the surface plate 172. Other plate engagement features having different configurations to prevent upward movement of the platform 100 may also be utilized.

Still referring to FIGS. 1A and 1B, the illustrated platform 100 further includes a locking mechanism 112 operable to releasably attach the platform 100 to the surface plate 172 of the fiber optic equipment 170. The locking mechanism of the illustrated embodiment is configured as a spring-loaded pin 112 having an end 113 that is positioned within a retention opening 174 configured as a hole within the surface plate 172. The spring-loaded pin 112 may be lifted to unlock the platform 100, and biased such that the end 113 is biased in a downward direction.

In the illustrated embodiment, the spring-loaded pin 112 is disposed in a flange 107 that orthogonally extends from a bottom edge of a front wall 106 that extends from the coupling surface 102. It should be understood that terms such as "front," "rear," "up," "down," and the like are used merely for convenience and are not intended to directionally limit components of the embodiments described herein. For example, the flange 107 may extend from a rear wall 108. The flange 107 positions the spring-loaded pin 112 closer to the surface plate 172. In other embodiments, a flange may not extend from the bottom edge of the front wall 106. For example, the spring-loaded pin 112 may be disposed within the coupling surface 102, or within a flange that extends from the coupling surface 102.

The platforms 100 described herein may be fabricated from any suitably rigid material. For example, the platforms 100 may be fabricated from molded plastic materials. In other embodiments, the platforms 100 may be fabricated from metal, such as aluminum. The platforms 100 should securely maintain the fiber optic cable assemblies to the fiber optic equipment 170 in response to external forces on the fiber optic cable assemblies.

Referring specifically to FIGS. 3A-3D, insertion of a platform 100 into fiber optic equipment 170 is depicted. FIG. 3A depicts the platform 100 prior to being secured to a surface plate 172. The surface plate 172 to which the platform 100 will be coupled is the floor of the fiber optic equipment 170, which may be a rack, frame, sub-frame, or any other component. It should be understood that the surface plate 172 may also be one or more walls of the fiber optic equipment 170, or the top of the fiber optic equipment 170.

The illustrated surface plate 172 includes one universal footprint 171 defined by four equipment engagement features 173 configured as slots. The universal footprint 171 further includes a retention opening 174 for receipt of the spring-loaded pin 112. There may be many universal footprints throughout the fiber optic equipment 170. The universal footprints provide locations within the fiber optic equipment 170 where platforms 100 (and fiber optic cable assemblies) may be secured.

The positions of the equipment engagement features 173 and the retention opening 174 correspond to the positions of the plate engagement features 110 and the spring-loaded pin 112, respectively. FIG. 3B illustrates the platform 100 depicted in FIGS. 1A, 1B and 2 just prior to insertion into the universal footprint 171. To connect the platform 100 to the surface plate 172, each plate engagement feature 110 may be aligned with the respective equipment engagement feature 173 slot. In this position, the end 113 of the spring-loaded pin 112 is offset with respect to the retention opening 174 on the surface plate 172. The platform 100 is then lowered, as indicated by arrow A. Next, the platform 100 may be laterally moved as indicated by arrow B such that the hook-shaped plate engagement feature 110 contacts the surface plate 172.

More specifically, a thickness of the surface plate 172 is positioned between the wide horizontal portion 111 of the plate engagement feature 110 and the sidewall 104. Additionally, shifting the platform 100 also causes the end 113 of the spring-loaded pin 112 to be disposed within the retention opening 174. The relationship between the hook-shaped plate engagement features 110 and the equipment engagement features 173 prevent movement of the platform 100 in up and down directions, while the relationship between the spring-loaded pin 112 and the retention opening 174 prevents lateral movement of the platform 100.

Figure 3D:
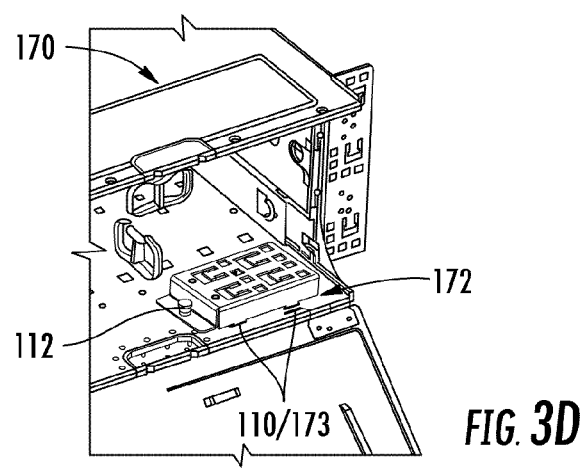
FIG. 3D depicts the fiber optic equipment depicted in FIG. 3A with a platform coupled thereto.

FIG. 3D depicts a platform 100 coupled to the surface plate 172, as described above. The fiber optic cable assembly (e.g., fiber optic cable assembly 140 depicted in FIG. 2) may be connected to the platform 100 after it is secured to the surface plate 172, as shown in FIG. 3D, or before being secured to the surface plate 172. To disconnect the platform 100 from the fiber optic equipment 170, the spring-loaded pin may be lifted, the platform 100 then shifted in a direction opposite from arrow B, and lifted up.

It should be understood that locking mechanisms other than the spring-loaded pin may be used. For example, the locking mechanism may be configured as a screw (e.g., a set screw), a quarter-turn nut, a magnetic latching mechanism, and the like.

Accordingly, embodiments of the present disclosure enable fiber optic cable assemblies of various configurations and styles to be releasably secured to fiber optic equipment using a universal footprint. As such, surface plates of the fiber optic equipment need only include one type of footprint, which may save manufacturing costs.

As stated above, platforms may be designed according to the type of fiber optic cable assembly that is to be secured to the fiber optic equipment. For example, a fiber optic cable assembly, such as a trunk cable assembly having a furcation, may be packaged along with the appropriate platform for securing the fiber optic cable assembly to the fiber optic equipment. Described below are several platforms that accommodate several fiber optic cable assemblies. However, embodiments are not limited to the platforms and fiber optic cable assemblies illustrated and described herein.

Figure 4:
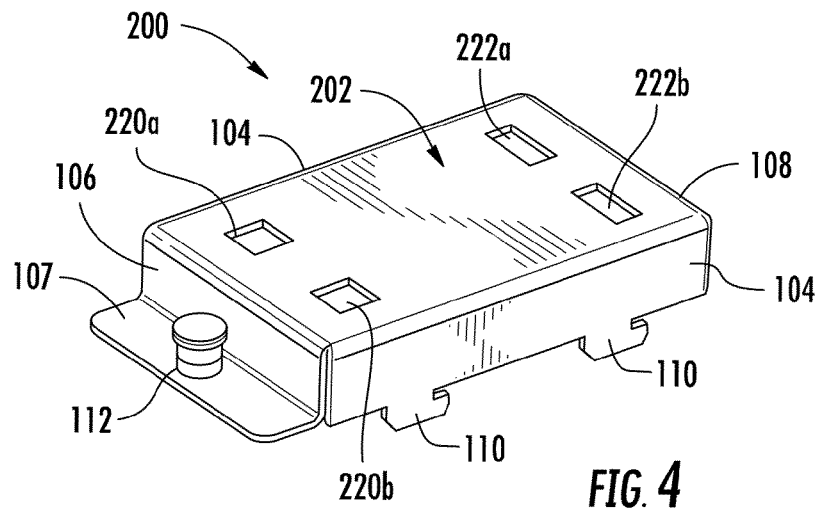
FIG. 4 depicts a top perspective view of a platform for connecting to fiber optic equipment, and configured to be coupled to a fiber optic cable assembly by a clip.
Figure 5A:
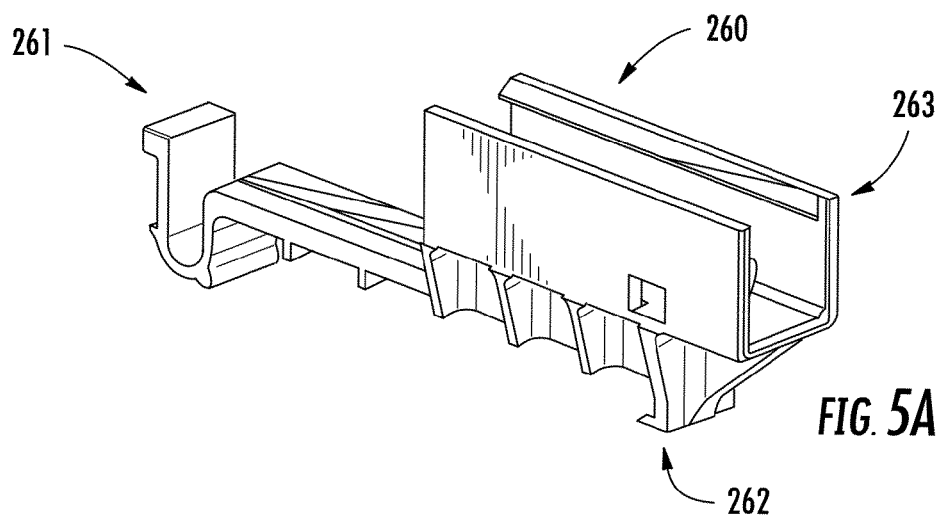
FIG. 5A depicts a top perspective view of a clip capable of being coupled to the platform depicted in FIG. 4.
Figure 5B:
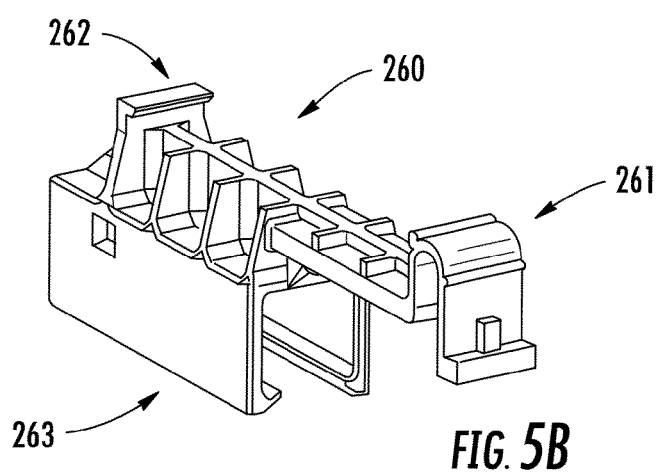
FIG. 5B depicts a bottom perspective view of the clip depicted in FIG. 5A.
Figure 6:
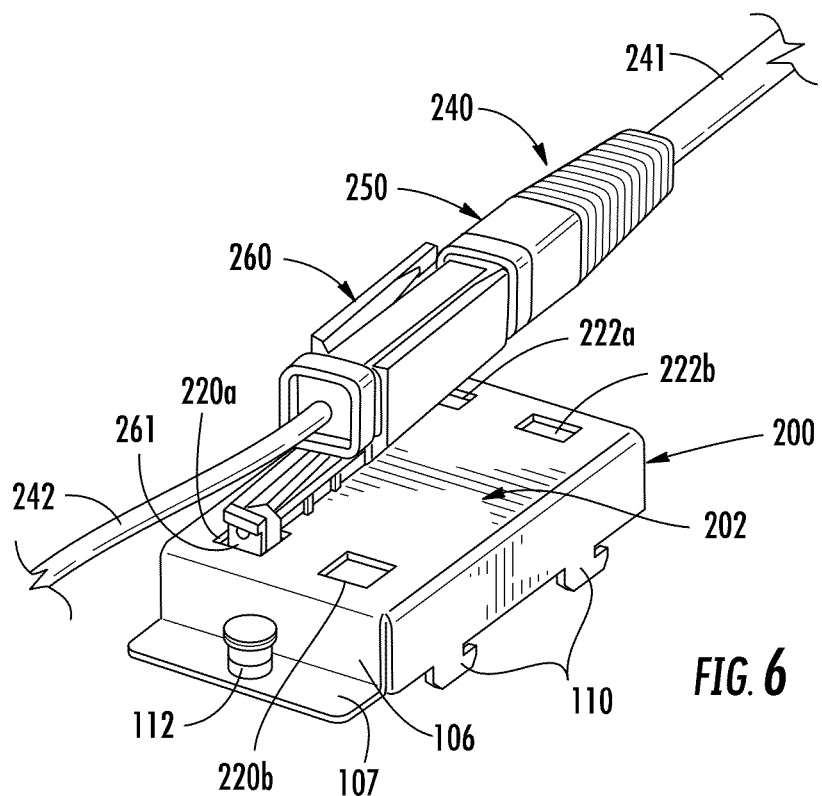
FIG. 6 depicts a top perspective view of the platform depicted in FIG. 4 with a fiber optic cable assembly coupled thereto.

FIGS. 4, 5A, 5B and 6 depict a fiber optic cable assembly coupling system, according to one embodiment. Referring initially to FIG. 6, a platform 200 is configured to accept features of a furcation clip 260 that surrounds a furcation housing 250 of a fiber optic cable assembly 240. The fiber optic cable assembly 240 further includes a trunk 241 and at least one leg 242. The furcation clip 260 and the furcation housing 250 correspond to one particular configuration of a fiber optic cable assembly 240. FIG. 4 depicts a platform 200 having a coupling surface 202 configured to accept features of the furcation clip 260, while FIGS. 5A and 5B depict two perspective views of the furcation clip 260.

Referring now to FIG. 4, the exemplary platform 200 is similar to the tie-wrap platform 100 described above, except that the coupling surface 202 is configured to receive the furcation clip 260. More specifically, the coupling surface 202 has first cable engagement features 220a, 220b and second cable engagement features 222a, 222b. The first cable engagement features 220a, 220b are positioned and configured to receive a first engagement tab 261 of the furcation clip 260, and the second cable engagement features 222a, 222b are configured to receive a second engagement tab 262 of the furcation clip 260. The platform 200 depicted in FIG. 4 is capable of receiving two fiber optic cable assemblies 240.

FIGS. 5A and 5B depict an exemplary furcation clip 260 having a first engagement tab 261 and a second engagement tab 262. The furcation clip 260 further includes a clip housing 263 that is configured to surround the furcation housing 250 of the fiber optic cable assembly 240, thereby securing the furcation clip 260 to the fiber optic cable assembly 240. Referring to FIG. 6, the first engagement tab 261 snaps into one of the first cable engagement features 220a, 220b, while the second engagement tab 262 snaps into one of the second cable engagement features 222a, 222b, thereby securing the furcation clip 260 and the fiber optic cable assembly 240 to the platform 200. The platform 200 may be secured to a fiber optic equipment 170 as described above and depicted in FIGS. 3A-3D.

Figure 7:
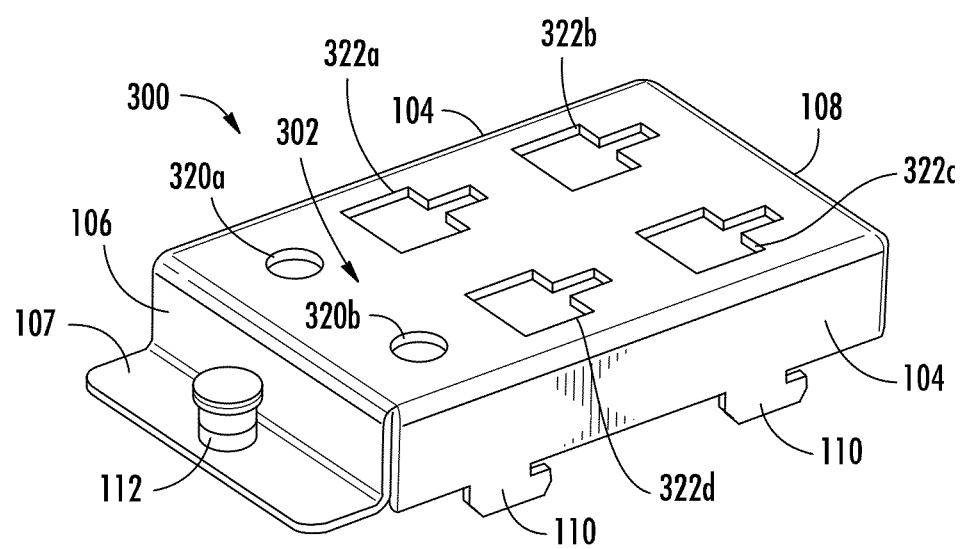
FIG. 7 depicts a top perspective view of a platform for connecting to fiber optic equipment, and configured to be coupled to a fiber optic cable assembly by another clip.
Figure 9:
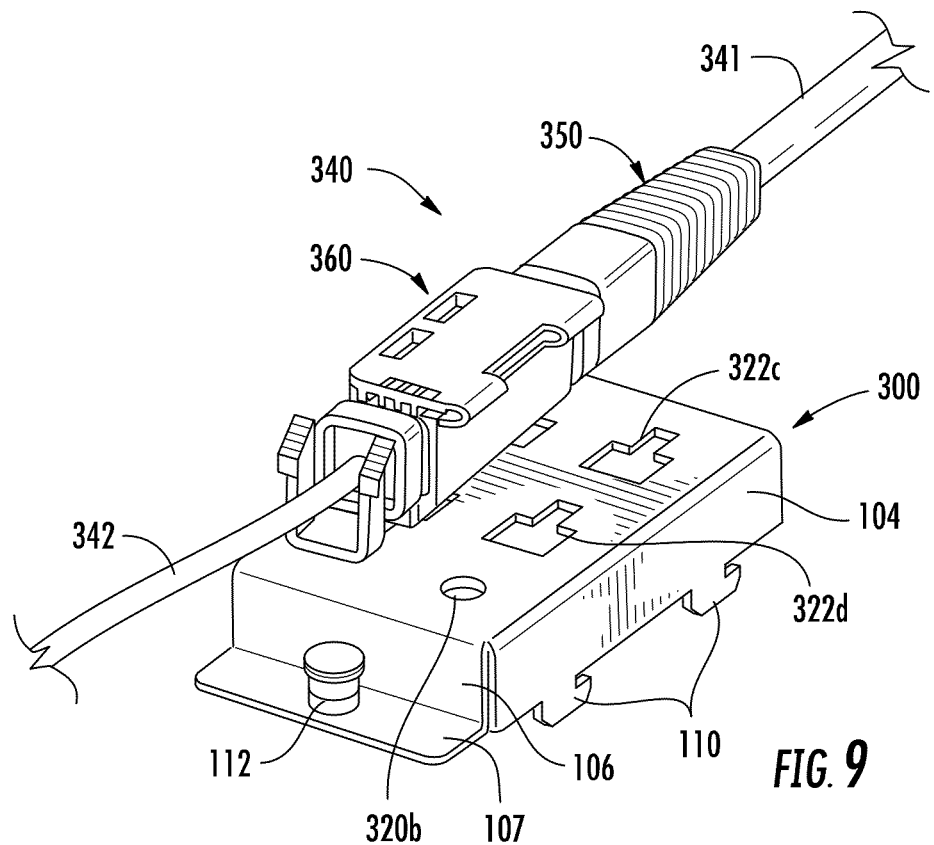
FIG. 9 depicts a top perspective view of the platform depicted in FIG. 7 with a fiber optic cable assembly coupled thereto.

FIGS. 7, 8A-8D, and 9 depict a fiber optic cable assembly coupling system according to another style of furcation housing and furcation clip. Referring initially to FIG. 9, a platform 300 is configured to accept features of a furcation clip 360 that surrounds a furcation housing 350 of a fiber optic cable assembly 340. The fiber optic cable assembly 340 further includes a trunk 341 and at least one leg 342. The furcation clip 360 and the furcation housing 350 correspond to one particular configuration of a fiber optic cable assembly 340 that is different from the fiber optic cable assembly 240 that is depicted in FIG. 6. FIG. 7 depicts a platform 300 having a coupling surface 302 configured to accept features of the furcation clip 360, while FIGS. 8A-8D depict perspective views of the furcation clip 260 in opened and closed positions.

Referring now to FIG. 7, the exemplary platform 300 is similar to the platforms 100, 200 described above, except that the coupling surface 302 is configured to receive the style of the furcation clip 360 depicted in FIGS. 8A-8D. More specifically, the coupling surface 302 has first cable engagement features 320a, 320b and second cable engagement features 322a, 322b, 322c, 322d. The first cable engagement features 320a, 320b are positioned and configured to receive a semi-circular first engagement tab 361 of the furcation clip 360, and the second cable engagement features 322a, 322b are configured to receive second engagement tabs 362a, 362b of the furcation clip 360. In the illustrated embodiment, the second cable engagement features 322a-322d are configured as "T"-shaped openings within the coupling surface 302. The platform 300 depicted in FIG. 7 is capable of receiving two fiber optic cable assemblies 340.

FIG. 8A is a top perspective view of the furcation clip 360 having a locking flap 364 in an opened position. FIGS. 8B and 8C are bottom perspective views of the furcation clip 360 with the locking flap 364 in an opened position, and FIG. 8D is a bottom perspective view of the furcation clip 360 with the locking flap 364 in a closed position. The locking flap 364 closes to define a clip housing 363 that surrounds a furcation housing 350 of the fiber optic cable assembly 340, as shown in FIG. 9. The locking flap 364 includes first locking features 365 that are configured to mate with second locking features 366 to maintain the locking flap 364 in a closed position.

Referring now to FIGS. 8B-8D, an underside surface 367 of the furcation clip 360 includes a first engagement tab 361 that is configured as a semi-circular protrusion. The underside surface 367 further includes two triangular second engagement tabs 362a, 362b. The coupling surface 302 of the platform 300 is configured such that the furcation clip 360 may be connected to the platform 300 by positioning a front region of the second engagement tabs 362a, 362b into the second cable engagement features (e.g., second cable engagement features 322a, 322b), pulling the furcation clip 360 toward the front wall 106 of the platform, and snapping the first engagement tab 361 into the first cable engagement feature (e.g., cable engagement feature 320a). The platform 300 may be secured to fiber optic equipment 170 as described above.

Figure 10:
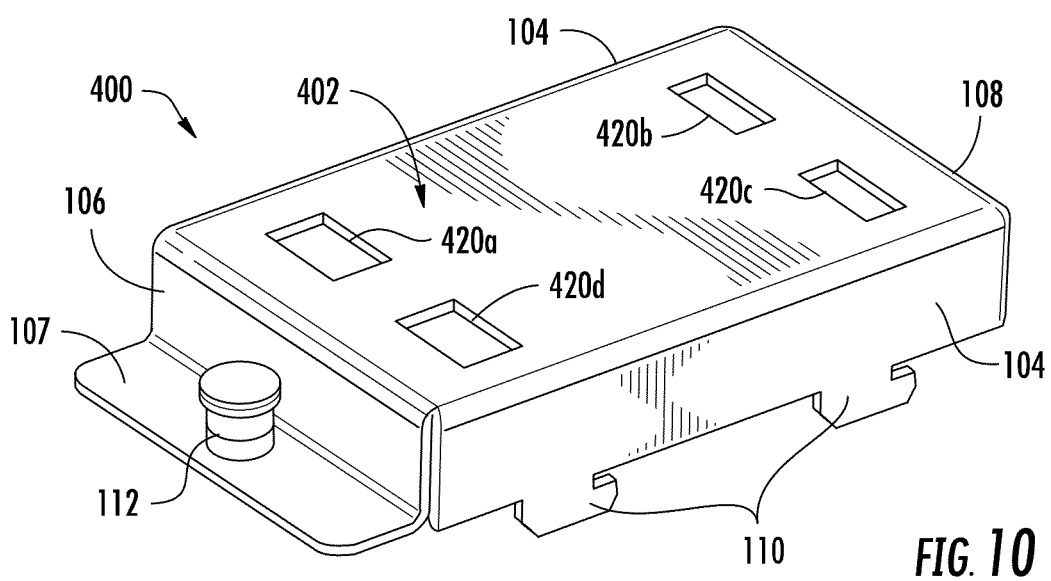
FIG. 10 depicts a top perspective view of a platform for connecting to fiber optic equipment, and configured to be coupled to a fiber optic cable assembly by another clip.
Figure 11A:
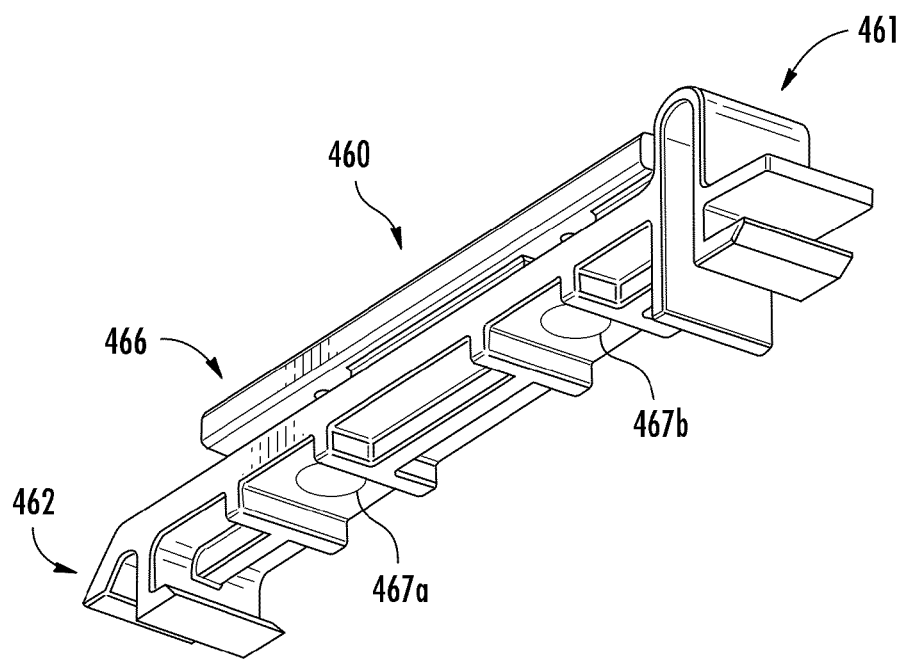
FIG. 11A depicts a bottom perspective view of a clip capable of being coupled to the platform depicted in FIG. 10.
Figure 11B:
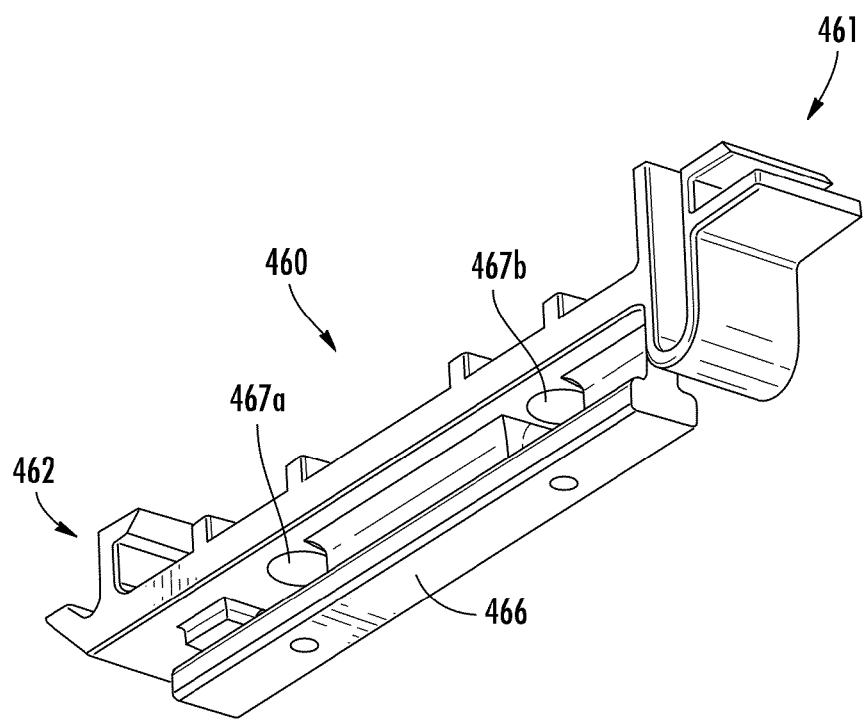
FIG. 11B depicts a top perspective view of the clip depicted in FIG. 11A.
Figure 11C:
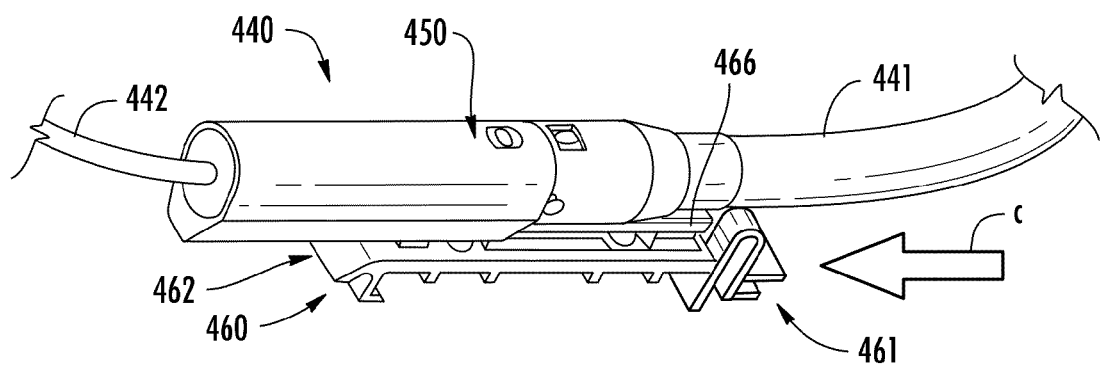
FIG. 11C depicts a top perspective view of the clip depicted in FIG. 11A coupled to a furcation housing of a fiber optic cable assembly.
Figure 11D:
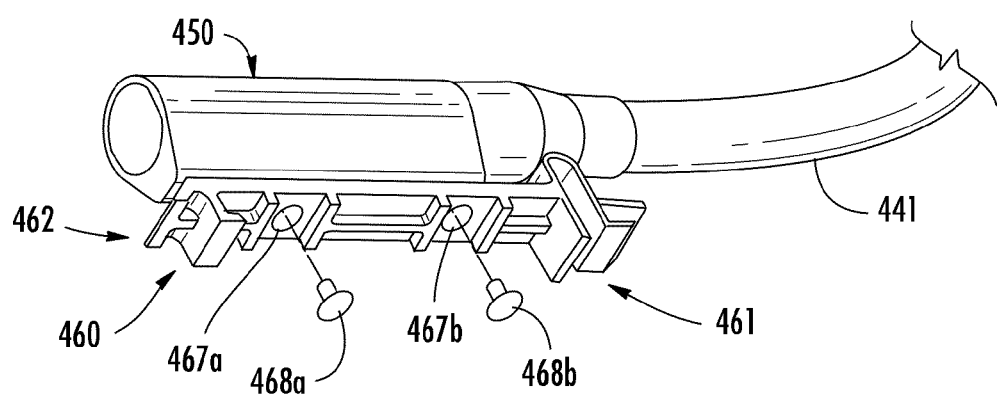
FIG. 11D depicts a bottom perspective view of the clip and furcation housing depicted in FIG. 11C.
Figure 12:
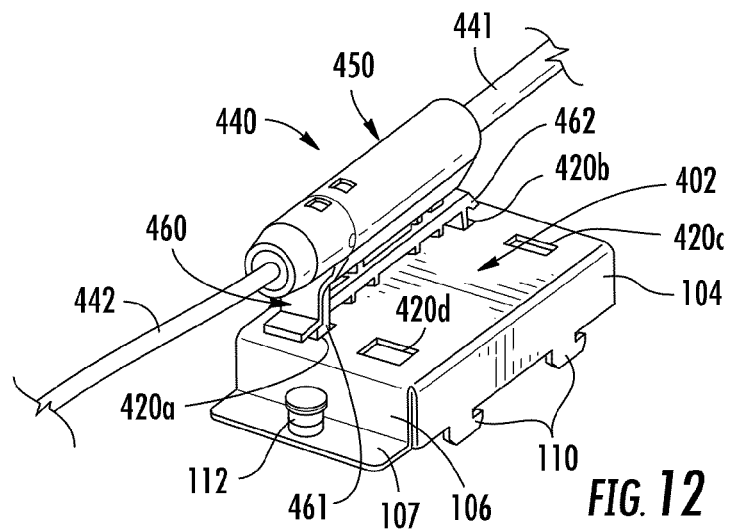
FIG. 12 depicts a top perspective view of the platform depicted in FIG. 10 with a fiber optic cable assembly coupled thereto.

FIGS. 10, 11A-11D, and 12 depict a fiber optic cable assembly coupling system according to yet another style of furcation housing and furcation clip. Referring initially to FIG. 12, a platform 400 is configured to accept features of a furcation clip 460 that is clipped to a furcation housing 450 of a fiber optic cable assembly 440. The fiber optic cable assembly 440 further includes a trunk 441 and at least one leg 442. The furcation clip 460 and the furcation housing 450 correspond to one particular configuration of a fiber optic cable assembly 440. FIG. 10 depicts a platform 400 having a coupling surface 402 configured to accept features of the furcation clip 460, while FIGS. 11A-11D depict perspective views of the furcation clip 460 in unclipped and clipped positions with respect to the furcation housing 450.

Referring now to FIG. 10, the exemplary platform 400 has a coupling surface 402 that is configured to receive the furcation clip 460 depicted in FIGS. 11A-11D. More specifically, the coupling surface 402 has first cable engagement features 420a, 420b and second cable engagement features 422a, 422b. The first cable engagement features 420a, 420b are positioned and configured to receive a first engagement tab 461 of the furcation clip 460, and the second cable engagement features 422a, 422b are configured to receive a second engagement tab 462 of the furcation clip 260. The platform 400 depicted in FIG. 10 is capable of receiving two fiber optic cable assemblies 440.

FIG. 11A depicts an underside of the furcation clip 460, while FIG. 11B depicts an upper side of the furcation clip 460. Generally, the furcation clip 460 includes a first engagement tab 461 and a second engagement tab 462. Referring briefly to FIG. 12, the first engagement tab 261 snaps into one of the first cable engagement features 420a, 420b, while the second engagement tab 262 snaps into one of the second cable engagement features 422a, 422b, thereby securing the furcation clip 460 and the fiber optic cable assembly 440 to the platform 200.

Unlike the previously described furcation clips, the present furcation clip 460 does not define a clip housing that surrounds the furcation housing 450 of the fiber optic cable assembly 440. Rather, the furcation clip 460 includes an engagement clip 466 on the upper side that connects to the furcation housing 450. As shown in FIG. 11C, the engagement clip 466 is slid into the furcation housing 450. The underside of the furcation clip 460 includes two holes 467a and 467b that align with corresponding holes in the furcation housing. The furcation clip 460 may be secured to the furcation housing 450 by inserting screws 468a, 468b into the two holes 467a, 467b, as shown in FIG. 11D. The platform 400 may be secured to fiber optic equipment 170 as described above.

Figure 13:
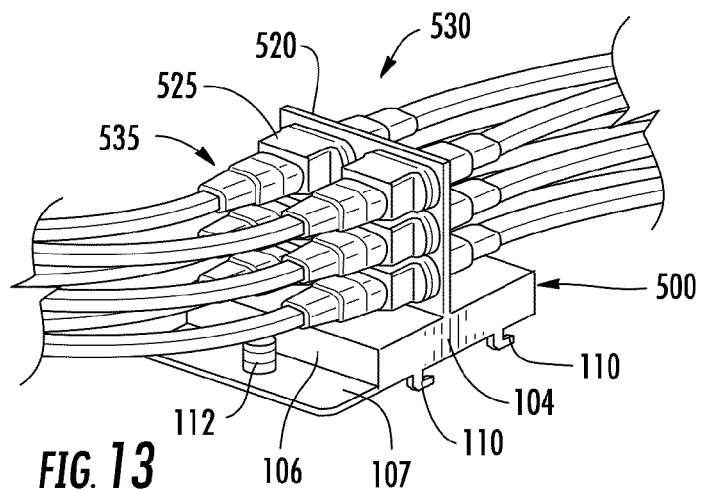
FIG. 13 depicts a perspective view of a platform having a vertical plate maintaining a plurality of adapters.
Figure 14:
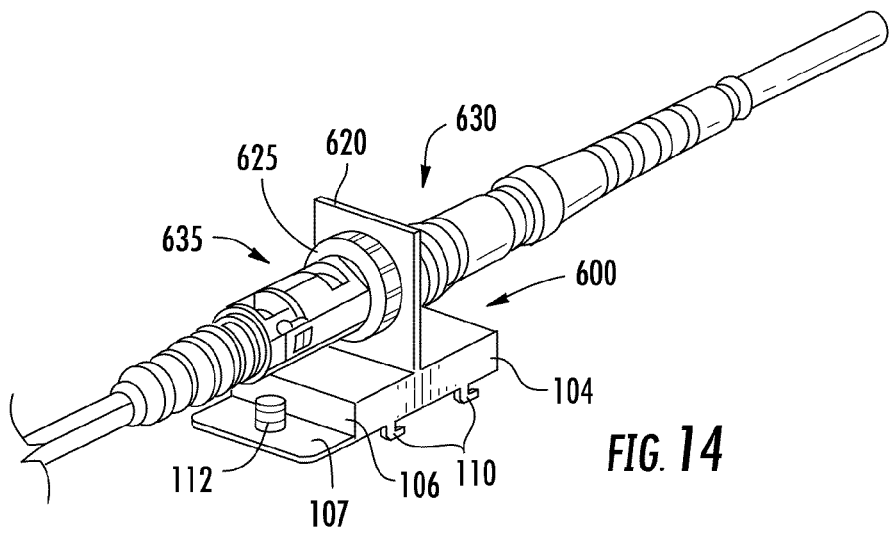
FIG. 14 depicts a perspective view of a platform having a vertical plate maintaining an adapter.

Embodiments described herein may also be utilized to not only secure furcations of fiber optic cable assemblies in fiber optic equipment, but also to secure the connectors of the fiber optic connector assemblies. FIGS. 13 and 14 depict two exemplary platforms that include adapters to couple various connectors together. The platforms may then be mounted into fiber optic equipment as described above. The platform 500 depicted in FIG. 13 comprises a vertical plate 520 including a plurality of adapters 525. Optical fiber assemblies 535 having a first connector type may be connected to a first side of the adapters 525, while optical fiber assemblies 530 having a second connector type may be connected to a second side of the adapters 525. As an example and not a limitation, one or more of the adapters may be configured to couple multi-fiber termination push-on connectors together. It should be understood that the adapters 525 may be configured to couple any type of optical connector, including the same type of connectors. It should also be understood that any number or type of adapters 525 may be provided. The adapters 525 may be single fiber or multiple fiber connector adapters. FIG. 14 depicts a platform 600 having a vertical plate 620 comprising a single adapter 625 used to couple a first fiber optic cable assembly 630 to second optical cable assembly 635. For example, the second optical cable assembly 635 may provide a truncation of a plurality of connectorized optical fibers that may be connected to points within the fiber optic equipment, as described above. As an example and not a limitation, the adapter 525, 625 may be configured to couple Corning® OptiTip® or OptiTap® connectors.

Figure 15A:
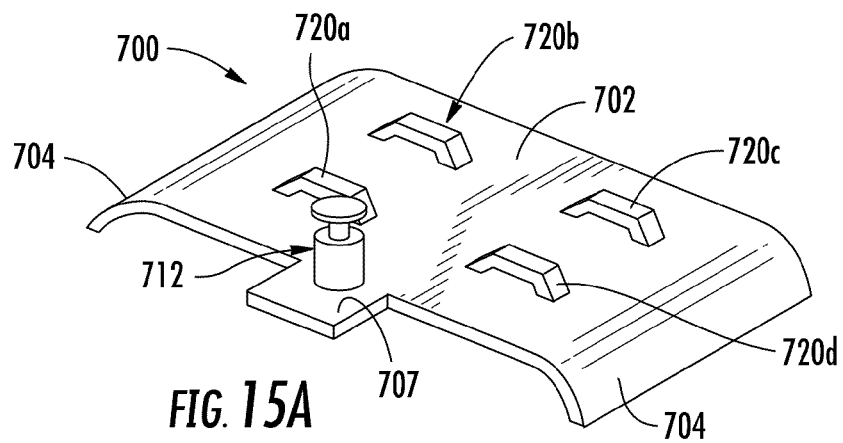
FIG. 15A depicts a top perspective view of a platform for connecting to a fiber optic communication enclosure, and configured to be coupled to a fiber optic cable assembly by a wrap.
Figure 15B:
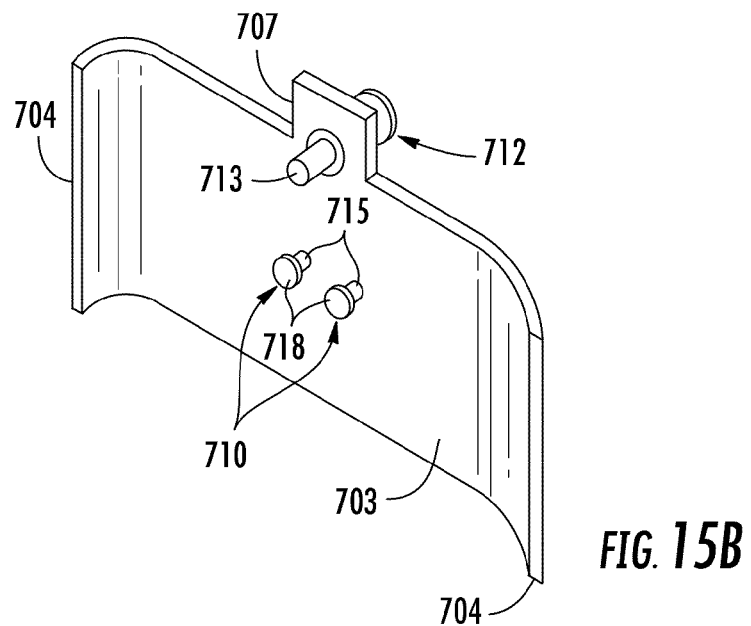
FIG. 15B depicts a bottom perspective view of the platform depicted in FIG. 15A.
Figure 16:
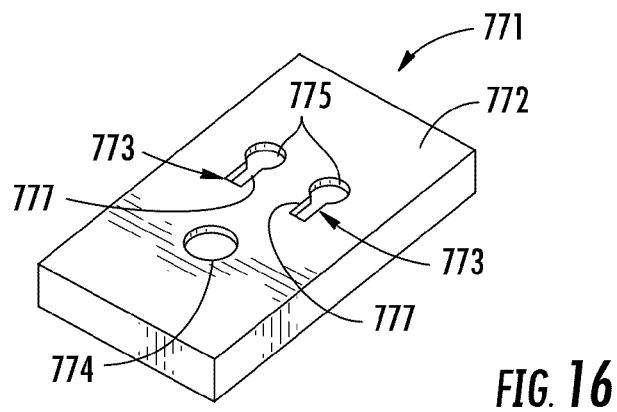
FIG. 16 depicts a fiber optic equipment having a universal footprint configured to accept the platform depicted in FIGS. 15A and 15B.

Referring now to FIGS. 15A, 15B, and 16, an alternative platform 700 and surface plate 772 of fiber optic equipment is depicted. The alternative platform 700 may be utilized in applications where space within the fiber optic equipment is limited, for example. The platform 700 generally includes a coupling surface 702 having a plurality of cable engagement features 720a-720d. The cable engagement features 720a-720d of the illustrated embodiment are configured as loops through which a wrap (e.g., a tie wrap, Velcro, etc.) may be disposed and wrapped around a fiber optic cable assembly. However, the coupling surface 702 may be configured to have any type of cable engagement features including, but not limited to, those cable engagement features described above.

The platform 700 also includes two curved sidewalls 704. In other embodiments, the sidewalls 704 may be straight walls. Extending from the coupling surface 702 is a flange 707 through which a spring-loaded pin 712 is disposed. The spring-loaded pin 712 may operate as the spring-loaded pin 112 described above. In other embodiments, the spring-loaded pin 712 may be disposed in the coupling surface 702 rather than through a flange.

An underside 703 of the platform 700 may include one or more plate engagement features 710 configured to be coupled to equipment engagement features 773 of a surface plate 772 within fiber optic equipment. In the illustrated embodiment, the plate engagement features 710 include a narrow region 715 that extends from the underside surface 703 of the platform 700. The narrow region 715 terminates in a wide region 718 that is wider than the narrow region 715.

Referring to FIG. 16, a universal footprint 771 of a surface plate 772 is illustrated. In some embodiments, the universal footprint 771 is provided on a base that is raised with respect to a remaining surface of the surface plate 772. In other embodiments, the universal footprint 771 is provided directly on the surface plate 772. The universal footprint 771 includes one or more equipment engagement features 773 configured to be mated with the one or more plate engagement features 710 of the platform 700. In the illustrated embodiment, there are two plate engagement features 710 and two corresponding equipment engagement features 773. The equipment engagement features 773 may be configured as a "keyhole" slot having a wide circular portion 775 for receipt of the wide region 718 of the plate engagement feature 710, and a narrow rectangular portion 777 for preventing the platform 700 from being lifted off the surface plate.

The universal footprint 771 further includes a retention opening 774, which may be a through-hole to receive the spring-loaded pin 712, as described above. In other embodiments, a locking mechanism other than a spring-loaded pin may be used.

To couple the platform 700 to the surface plate 772 of fiber optic equipment, the wide region 718 of the plate engagement features 710 are aligned with the wide circular portion 775 of the equipment engagement features 773 and positioned therein. The platform 700 may then be laterally translated such that the narrow region 715 of the plate equipment features 710 are disposed within the narrow rectangular portion 777 of the equipment engagement features 773. In this position, the spring-loaded pin 712 is then disposed in the retention opening 774 to prevent lateral movement of the platform 700.

Figure 17A:
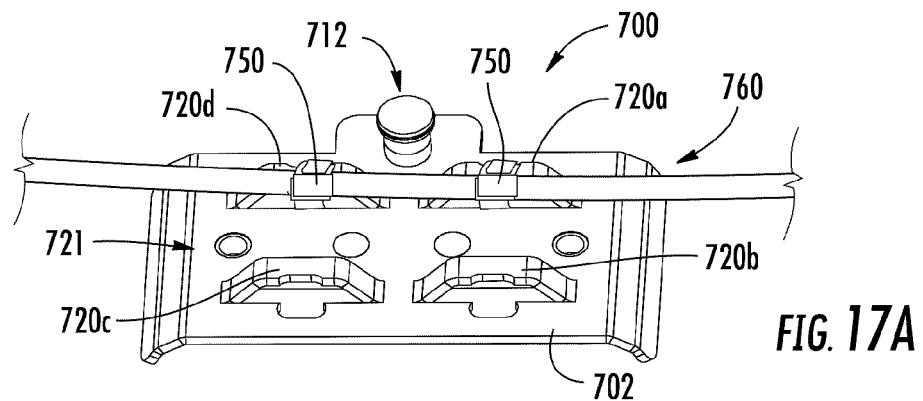
FIGS. 17A-17D depict a top perspective view of the platform depicted in FIGS. 15A and 15B coupled to a variety of fiber optic cable assemblies.
Figure 17B:
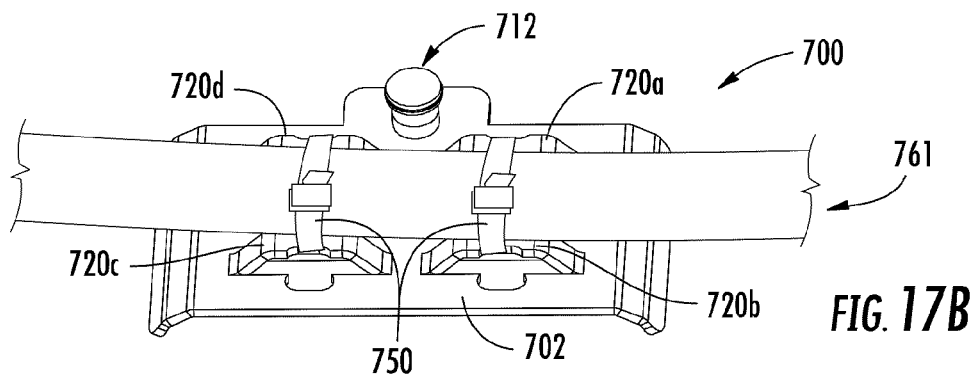
Figure 17C:
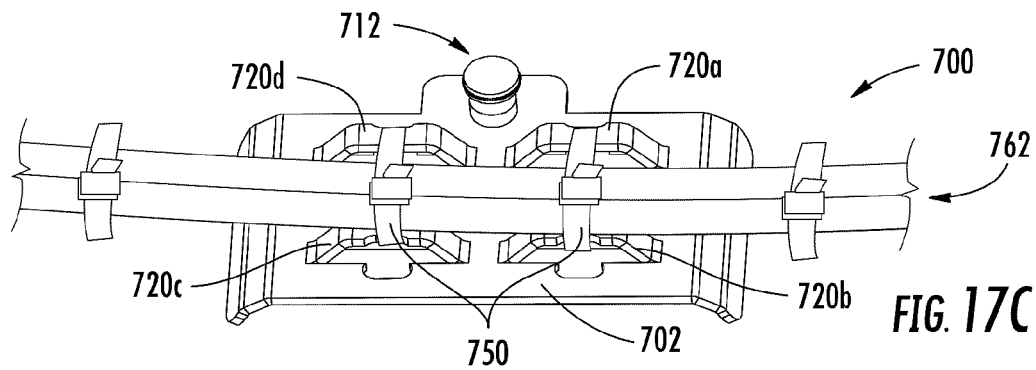

FIGS. 17A-17D depict platforms 700 as depicted in FIGS. 15A and 15B coupled to a variety of exemplary fiber optic cable assemblies. FIG. 17A depicts a platform securing a thin fiber optic cable assembly 760 via two tie-wraps 750 wrapped around cable engagement features 720a and 720d, which may be in the form of a single fiber optic cable. Similarly, the platform depicted in FIG. 17B secures a fiber optic cable assembly 761 having a larger diameter than the fiber optic cable assembly depicted in FIG. 17A. The fiber optic cable assembly 761 is secured to the platform 700 by two tie-wraps that are wrapped around each of the cable engagement features 720a-720d. FIG. 17C depicts a plurality of fiber optic cable assemblies 762 maintained by tie-wraps that are wrapped around each of the cable engagement features 720a-720d.

Figure 17D:
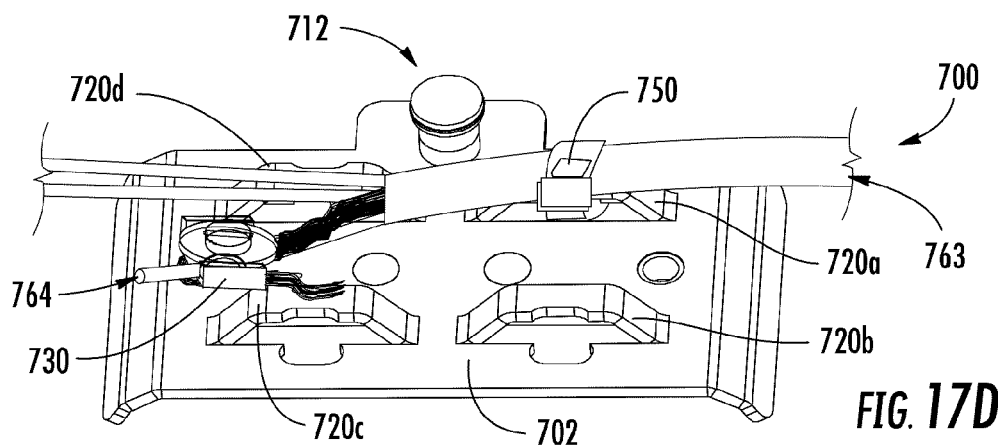

The platform 700 may have additional features for securing fiber optic cable assemblies or other components thereto. For example, the platform illustrated in FIGS. 17A-17D includes a plurality of through-holes 721 to which additional hardware may be mounted. As shown in FIG. 17D, a fiber optic cable assembly 763 having a truncation is secured to the platform 700 by a tie-wrap that is wrapped around cable engagement feature 720a. A leg 764 of the fiber optic cable assembly 763 is individually secured to the platform 700 by an additional fastener component 730 that is screwed into one of the through-holes 721. It should be understood that any additional fastener component may be provided, and embodiments are not limited to the additional fastener component 730 depicted in FIG. 17D.

It should now be understood that embodiments disclosed herein are directed to platforms for connecting fiber optic cable assemblies to fiber optic equipment using a universal footprint. The platforms described herein may be installed and removed from the fiber optic equipment without the use of tools. The ability to remove the platform enables other types of platforms corresponding to other types of fiber optic cable assemblies to be used without modification to the fiber optic equipment.

Many modifications of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A platform for connecting at least one fiber optic cable assembly to a fiber optic equipment, the platform comprising:
a coupling surface comprising at least one cable engagement feature, wherein the at least one cable engagement feature is configured to couple the at least one fiber optic cable assembly to the coupling surface; and
a plurality of plate engagement features configured to be removably coupled to a plurality of equipment engagement features positioned on the fiber optic equipment;
wherein the at least one cable engagement feature comprises a first opening and a second opening; and
wherein the first opening is configured to receive a first engagement tab of a clip coupled to at least one fiber optic cable assembly, and the second opening is configured to receive a second engagement tab of the clip.

2. The platform as claimed in claim 1, wherein the at least one cable engagement feature comprises an opening and a protrusion within the opening.

3. The platform as claimed in claim 2, wherein the protrusion comprises a narrow portion and a wide portion.

4. The platform as claimed in claim 1, wherein the at least one cable engagement feature is configured to mate with at least one furcation housing of the at least one fiber optic cable assembly.

5. The platform as claimed in claim 1, further comprising a vertical plate extending from the coupling surface.

6. The platform as claimed in claim 5, wherein the vertical plate is configured to maintain one or more fiber optic cable assemblies.

7. The platform as claimed in claim 1, further comprising a first sidewall and a second sidewall, wherein individual plate engagement features of the plurality of plate engagement features are located on the first sidewall and the second sidewall, and each individual plate engagement feature is located and configured to mate with an engagement slot on the fiber optic equipment.

8. The platform as claimed in claim 7, wherein each individual plate engagement feature has a hook shape.

9. The platform as claimed in claim 7, wherein each individual plate engagement feature has a perpendicular portion extending from the first sidewall or the second sidewall, and a horizontal portion extending from the perpendicular portion.

10. The platform as claimed in claim 1, wherein each individual plate engagement feature comprises a narrow region extending from an underside surface of the platform that is opposite from the coupling surface, and a wide region extending from the narrow region, wherein each individual plate engagement feature is operable to be inserted into a keyhole-shaped slot on the fiber optic equipment.

11. The platform as claimed in claim 1, further comprising a locking mechanism operable to releasably lock the platform to the fiber optic equipment.

12. The platform as claimed in claim 1, further comprising a spring-loaded pin operable to engage a retention opening on the fiber optic equipment.

13. The platform as claimed in claim 12, further comprising a front wall extending from the coupling surface, and a flange perpendicularly extending away from the front wall, wherein the spring-loaded pin is disposed in the flange.

14. The platform as claimed in claim 1, further comprising a front wall, a first sidewall and a second sidewall, wherein the front wall, the rear wall, the first sidewall, and the second sidewall extend from the coupling surface.

15. A fiber optic cable assembly coupling system comprising:
at least one fiber optic cable assembly comprising an optical fiber cable; and
a platform comprising:
a coupling surface comprising at least one cable engagement feature, wherein the at least one cable engagement feature is configured to be coupled to the at least one fiber optic cable assembly; and a plurality of plate engagement features configured to be removably coupled to a plurality of equipment engagement features positioned on a fiber optic equipment; wherein:

the at least one cable engagement feature comprises a first opening and a second opening;

the at least one fiber optic cable assembly comprises a furcation housing;

the at least one fiber optic cable assembly further comprises a clip coupled to the furcation housing, wherein the clip comprises a first engagement tab and a second engagement tab; and the first opening is configured to receive the first engagement tab of the clip, and the second opening is configured to receive the second engagement tab of the clip.

16. The fiber optic cable assembly coupling system as claimed in claim 15, wherein:

the at least one cable engagement feature comprises an opening and a protrusion within the opening;

the protrusion comprises a narrow portion and a wide portion; and the fiber optic cable assembly coupling system further comprises a wrap disposed around the at least one fiber optic cable assembly and the narrow portion of the protrusion such that the at least one fiber optic cable assembly is coupled to the coupling surface of the platform.

17. The fiber optic cable assembly coupling system as claimed in claim 15, wherein the at least one cable engagement feature is configured to mate with at least one furcation housing of the at least one fiber optic cable assembly.

18. The fiber optic cable assembly coupling system as claimed in claim 15, wherein:

the platform further comprises a first sidewall and a second sidewall; and individual plate engagement features of the plurality of plate engagement features are located on the first sidewall and the second sidewall and configured to mate with an engagement slot on the fiber optic equipment.

19. The fiber optic cable assembly coupling system as claimed in claim 15, wherein each individual plate engagement feature comprises a narrow region extending from an underside surface of the platform that is opposite from the coupling surface, and a wide region extending from the narrow region, wherein each individual plate engagement feature is operable to be inserted into a keyhole-shaped slot on the fiber optic equipment.

20. The fiber optic cable assembly coupling system as claimed in claim 15, further comprising a locking mechanism operable to lock the platform to the fiber optic equipment.

21. A platform for connecting one or more fiber optic cable assemblies to fiber optic equipment, the platform comprising:

a coupling surface comprising at least one cable engagement feature, wherein the at least one cable engagement feature is configured to couple at least one fiber optic cable assembly to the coupling surface;

a front wall extending from a front edge of the coupling surface;

a first sidewall extending from a first edge of the coupling surface;

a second sidewall extending from a second edge of the coupling surface;

a flange orthogonally extending from the front wall;

a plurality of hook-shaped plate engagement features extending from a bottom edge of the first sidewall and the second sidewall, the plurality of hook-shaped plate engagement features configured to be removably coupled to a plurality of engagement slots positioned on the fiber optic equipment; and a spring-loaded pin disposed in the flange, the spring-loaded pin operable to removably engage a retention opening on the fiber optic equipment.

22. A platform for connecting one or more fiber optic cable assemblies to fiber optic equipment, the platform comprising:

a coupling surface comprising at least one cable engagement feature, wherein the at least one cable engagement feature is configured to couple at least one fiber optic cable assembly to the coupling surface;

a bottom surface that is opposite from the coupling surface;

at least one plate engagement feature comprising a narrow region extending from the bottom surface, and a wide region extending from the narrow region, wherein the at least one plate engagement feature is operable to be inserted into a keyhole-shaped slot on the fiber optic equipment; and a spring-loaded pin extending from the bottom surface, the spring-loaded pin operable to removably engage a retention opening on the fiber optic equipment.

23. The platform as claimed in claim 1, wherein the at least one cable engagement feature is coplanar with the coupling surface.

24. The platform as claimed in claim 23, wherein the at least one cable engagement feature comprises an opening and a protrusion within the opening, wherein the protrusion is coplanar with the coupling surface.

25. The platform as claimed in claim 15, wherein the at least one cable engagement feature is coplanar with the coupling surface.

26. The platform as claimed in claim 25, wherein the at least one cable engagement feature comprises an opening and a protrusion within the opening, wherein the protrusion is coplanar with the coupling surface.

* * * * *